United States Patent [19]

Yonekawa et al.

[11] Patent Number: 5,013,062
[45] Date of Patent: May 7, 1991

[54] US-OS CHARACTERISTIC CONTROL SYSTEM FOR A VEHICLE RESPONDING TO TURNING STATE QUANTITY AND THE CHANGING RATE THEREOF

[75] Inventors: Takashi Yonekawa, Mishima; Toshio Onuma, Susono; Shuuichi Buma, Toyota; Hiroyuki Ikemoto, Susono; Kaoru Ohashi, Okazaki; Toshio Aburaya, Toyota; Kunihito Sato, Susono, all of Japan

[73] Assignee: Toyota Jidosha Kabushiki Kaisha Aichi, Japan

[21] Appl. No.: 459,325

[22] Filed: Dec. 29, 1989

[51] Int. Cl.$^5$ .................... B60G 17/00; B62D 15/00
[52] U.S. Cl. ............................. 280/707; 180/79.1; 180/141; 280/702; 280/709
[58] Field of Search ............ 280/707, 709, 714, 703, 280/91; 180/141, 79.1; 364/424.05

[56] References Cited

U.S. PATENT DOCUMENTS

| | | | |
|---|---|---|---|
| 4,712,807 | 12/1987 | Kurosawa | 280/707 |
| 4,761,022 | 8/1988 | Ohashi et al. | 280/772 |
| 4,834,205 | 5/1989 | Mizvno et al. | 180/141 |
| 4,874,183 | 10/1989 | Chikuma et al. | 180/141 |
| 4,947,327 | 8/1990 | Kawagoe | 180/141 |

FOREIGN PATENT DOCUMENTS

| | | |
|---|---|---|
| 0106697 | 4/1984 | European Pat. Off. . |
| 0236947 | 9/1987 | European Pat. Off. . |
| 0246655 | 11/1987 | European Pat. Off. . |
| 60-46315 | 4/1985 | Japan . |
| 62-198511 | 9/1987 | Japan . |
| 63-31810 | 2/1988 | Japan . |
| 63-106127 | 5/1988 | Japan . |
| 63-106128 | 5/1988 | Japan . |
| 63-145113 | 6/1988 | Japan . |

Primary Examiner—Richard A. Bertsoh
Attorney, Agent, or Firm—Oliff & Berridge

[57] ABSTRACT

In a system for controlling the US-OS characteristic of a vehicle having front and rear suspensions, a device for changing the US-OS characteristic is provided which is adapted to alter the roll stiffness distribution between the front and the rear suspensions. A turning state quantity is detected and the changing rate of a turning state quantity is determined. A control device is further provided which is adapted to respond to the turning state quantity and the changing rate of the turning state quantity, and to control the US-OS characteristic changing device so that the higher the changing rate of the turning state quantity is, the more the US-OS characteristic may be shifted toward higher over-steer, and for the same changing rate the higher the turning state quantity is, the more the US-OS characteristic may be shifted toward higher under-steer.

5 Claims, 26 Drawing Sheets

US-OS CHARACTERISTIC CONTROL SYSTEM FOR A VEHICLE RESPONDING TO TURNING STATE QUANTITY AND THE CHANGING RATE THEREOF

BACKGROUND OF THE INVENTION

1. Field of the Invention

The present invention relates to a US-OS characteristic control system for a vehicle such as an automobile or the like, and more particularly relates to an improved system for controlling the US-OS characteristic to enhance both the response during transitional turning and the controllability and stability during turning.

2. Prior Art

As is known in the art, in a vehicle such as an automobile or the like, it is generally preferable to set the US-OS characteristic to over-steer to enhance the response during transitional turning, while on the other hand, to set it to under-steer to enhance the controllability and stability during turning. In the Japanese Laying Open Publication No. Showa 62-198511, a suspension control system is described which is adapted to control the US-OS characteristic to be set to over-steer or neutral-steer in the initial stage of turning and to be set to under-steer in the final stage of turning. According to such a suspension control system, in the initial stage of turning the US-OS characteristic is set to over-steer or neutral-steer to enable a sharp turning and in the final stage of turning the characteristic is set to under-steer to assure the controllability and stability.

In the above described suspension control system, however, whether the turning state is in the initial stage or in the final stage is decided by determining whether or not the changing rate of turning state quantity such as differential value of yaw rate is larger and, accordingly, the US-OS characteristic is determined solely based upon the changing rate of turning state quantity. Therefore, it is difficult to enhance both the response during transitional turning and the controllability and stability during turning in a compatible manner. For example, in the afore mentioned suspension control system, since the US-OS characteristic is controlled to be over-steer or neutral-steer when the differential value of yaw rate exceeds a predeterminate value, if a steering angle increased or decreased during turning under the condition where the lateral acceleration of the vehicle is relatively large, the US-OS characteristic is set to over-steer or neutral-steer, which will deteriorate the controllability and stability of the vehicle.

SUMMARY OF THE INVENTION

Therefore, the object of the present invention is to provide an improved US-OS characteristic control system for a vehicle which is adapted to take into consideration a turning state quantity such as a lateral acceleration in addition to the changing rate of a turning state quantity when determining the US-OS characteristic during transitional turning and to set the transitional turning characteristic properly according to both a turning state quantity and the changing rate of a turning state quantity so that the response during transitional turning as well as the controllability and stability during turning may well be enhanced.

Another object of the present invention is to provide such a control system as above which is adapted to prevent the undesirable change of the US-OS characteristic due to the weight transfer during acceleration and deceleration.

The above mentioned principal object is accomplished, according to the present invention, by a control system for controlling the US-OS characteristic of a vehicle having suspension for the front and the rear vehicle wheels, comprising:

a means for changing the US-OS characteristic of the vehicle;

a means for detecting a turning state quantity;

a means for determining the changing rate of a turning state quantity;

a control means which, in response to the turning state quantity detected by said detecting means and the changing rate of the turning state quantity determined by said determining means, controls said US-OS characteristic changing means so that the higher the changing rate of the turning state quantity is, the more the US-OS characteristic may be shifted toward higher over-steer, and for the same changing rate the higher the turning state quantity is, the more the US-OS characteristic may be shifted toward higher under-steer.

According to the present invention, since the control means is adapted to control the US-OS characteristic changing means so that the higher the changing rate of a turning state quantity is, the more the US-OS characteristic may be shifted toward higher over-steer, and for the same changing rate the higher a turning state quantity is, the more the US-OS characteristic may be shifted toward higher under-steer, the US-OS characteristic during transitional turning can more appropriately be set in accordance with not only the changing rate of a turning state quantity but also a turning state quantity, which can enhance both the steering response during transitional turning and the controllability and stability during turning.

That is, in the situations where a transitional turning is conducted at a certain steering angle velocity, when a vehicle speed is lower and/or a steering angle is lower, the US-OS characteristic is not so much shifted toward higher under-steer and it is set to a characteristic whose degree in over-steer is higher, so that a better response during transitional turning can be assured, while when the vehicle speed is higher and/or the steering angle is higher, the US-OS characteristic is shifted toward higher under-steer, and the degree in over-steer is reduced or the US-OS characteristic is set to substantially neutral or under-steer, so that the controllability and stability of the vehicle can be enhanced.

It should be understood that the means for changing the US-OS characteristic in the control system of the present invention may be of any construction so long as it can alter the roll stiffness distribution between the front and the rear suspensions to change the US-OS characteristic of the vehicle. Thus, the means may be, for example, an active suspension system adapted to control the loaded weights of the respective vehicle wheels, stabilizers capable of variably controlling the roll stiffnesses of the front and rear parts of a vehicle body, suspension spring devices adapted to variably controlling the spring rates of suspension springs, damping force controlling devices adapted to variably controlling the damping forces of shock absorbers, any combination of the above-system or devices, and the like.

The term "turning state quantity" referred to in the present specification and the claims means a quantity representing the extent of turning and may be a lateral acceleration, a steering angle and a vehicle speed, a yaw rate, or the like. Accordingly, the means for detecting the turning state quantity may be a lateral acceleration sensor, the combination of a steering angle sensor and a vehicle speed sensor, a yaw rate sensor, or the like. The term "the changing rate of a turning state quantity" means the changing rate of the quantity representing the extent of turning and may be a steering angle velocity, the changing rate of a lateral acceleration, the changing rate of a yaw rate, or the like. Accordingly, the means for determining the changing rate of a turning state quantity may be the combination of a steering angle sensor, a lateral acceleration sensor, a yaw rate sensor or the like and a means for calculating the changing rate of the value detected by the associated sensor.

The present invention is now described in terms of preferred embodiment thereof with reference to the attached drawings.

DESCRIPTION OF THE PREFERRED EMBODIMENT

Figure 1:
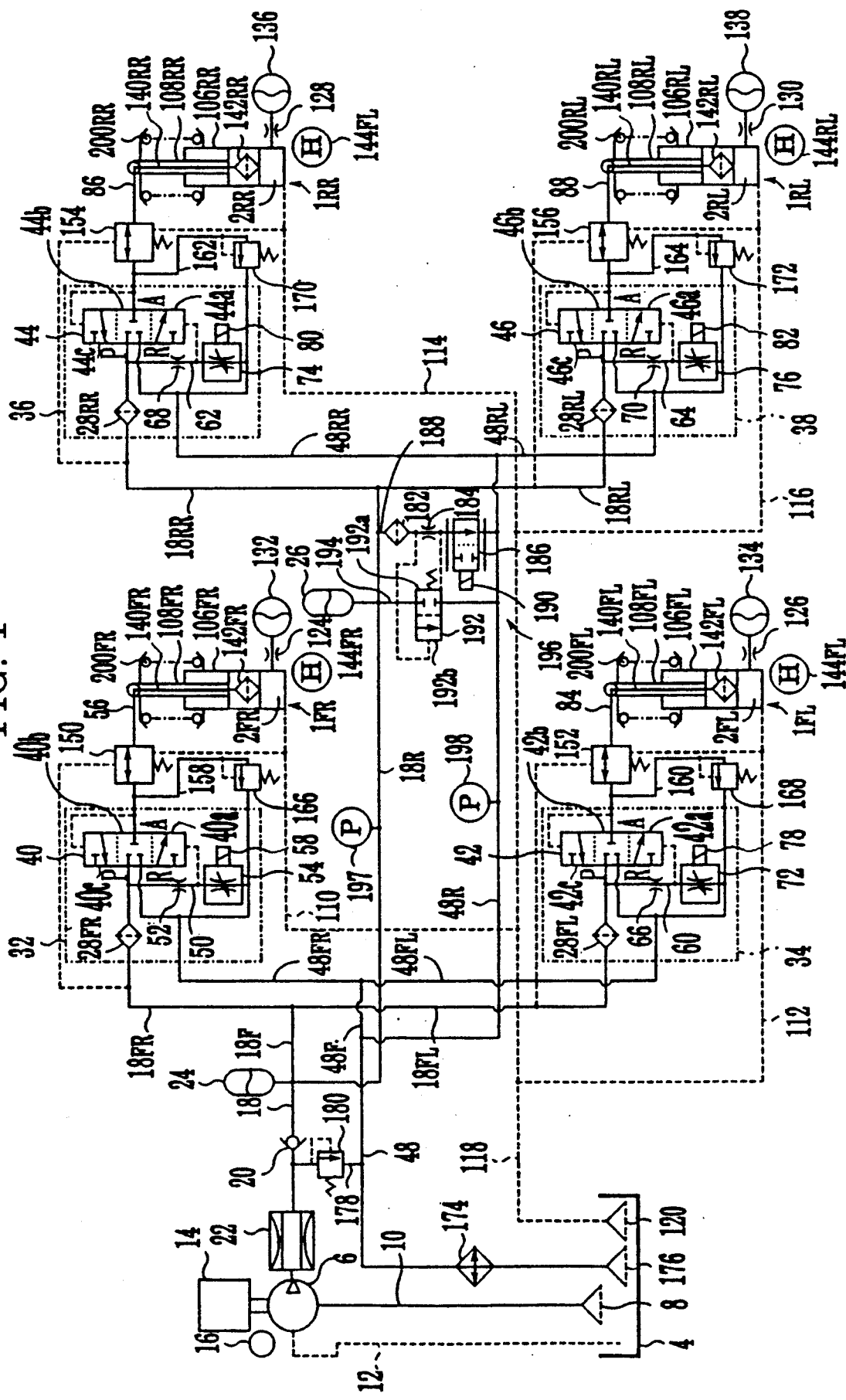
FIG. 1 is a schematic diagram showing major physical components of the preferred embodiment of the control system for a vehicle according to the present invention.

Referring to the drawings, FIG. 1 is a schematic diagram showing major physical components of the preferred embodiment of the control system of the present invention. The control system shown in FIG. 1 includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected with one ends of a high pressure flow line 18F for the front vehicle wheels and a high pressure flow line 18R for the rear vehicle wheels, with which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected at their one ends with the high pressure flow line 18F, while a high pressure flow line 18RR for the rear right vehicle wheel and a high pressure flow line 18RL for the rear left vehicle wheel are connected at their one ends with the high pressure flow line 18R. The high pressure flow lines 18FR, 18FL, 18RR and 18RL have therein filters 28FR, 28FL, 28RR and 28RL, respectively, and lines are connected at their other ends with ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other, a fixed flow restriction 52 and a variable flow restriction 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictions 52 and 54 and the pressure Pa within the connecting flow line 56, and to be shifted to a switching position 40a wherein it fluidly communicates the ports P and A with each other when the pressure Pp is substantially higher than the pressure Pa; a switching position 40b wherein it cuts the communication among the all ports when the pressure Pp and Pa are substantially equal to each other; and a shifting position 40c wherein it fluidly communicates the ports R and A with each other when the pressure Pp is substantially lower than the pressure Pa. The variable flow restriction 54 is adapted to vary its effective flow area by means of the electric current supplied to its solenoid 58 being controlled and to cooperate with the fixed flow restriction 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictions 66, 68 and 70 corresponding to the flow restriction 52, and variable flow restriction 72, 74 and 76 corresponding to the flow restriction 54, respectively. The variable flow restrictions 72, 74 and 76 have solenoids 78, 80 and 82, respectively, corresponding to the solenoid 58.

The switching control valves 42, 44 and 46 have the same construction as the switching valve 40, and have the ports R connected with one ends of a low pressure flow line 48FL for front left vehicle wheel, a low pressure flow line 48RR for rear right vehicle wheel, and a low pressure flow line 48RL for rear left vehicle wheel, respectively, and the ports A connected with one ends of connecting flow lines 84, 86 and 88, respectively. The switching valves 42, 44 and 46 are spool type valves adapted to take in as pilot pressures the pressures Pp within the associated flow lines 60, 62 and 64 between the associated fixed and the variable flow restrictions and the pressures Pa within the associated flow lines 84, 86 and 88, and to be shifted to switching positions 42a, 44a and 46a, respectively, wherein they fluidly communicate the ports P and A with each other when the pressures Pp are substantially higher than the pressures Pa; shifting positions 42b, 44b and 46b wherein they shut the communications among all the ports when the pressures Pp and Pa are substantially equal to each other; and shifting positions 42c, 44c and 46c wherein they fluidly communicate the ports R and A with each other when the pressures Pp are substantially lower than the pressures Pa.

As is schematically shown in FIG. 1, the actuators 1FR, 1FL, 1RR and 1RL include cylinders 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown, with each cylinder being coupled to the associated suspension arm and the upper extremity of the rod portion of each piston being coupled to the vehicle body, each cylinder may be coupled to the vehicle body and each piston may be coupled to the associated suspension arm. Drain flow lines 110, 112, 114 and 116 are fluidly connected at their one ends with the cylinders 106FR, 106FL, 106RR and 106RL, respectively, of the actuators. The other ends of the drain lines 110, 112, 114 and 116 are connected with a drain flow line 118, which is in turn connected with the reserve tank 4 by way of a filter 120 so that the oil leaking from the working fluid chambers may be returned into the tank.

To the working fluid chambers 2FR, 2FL, 2RR and 2RL are connected accumulators 132, 134, 136 and 138, respectively, serving as hydropneumatic springs by way of flow restrictions 124, 126, 128 and 130, respectively. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chambers 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, which detect the vehicle heights at the locations corresponding to the associated vehicle wheels.

Thus, the pressure control valves, actuators and the flow lines not only serve to increase and decrease the vehicle heights at the locations corresponding the vehicle wheels, but also cooperate with each other to define a means for changing the US-OS characteristic of the vehicle by controlling the loaded weights of the associated vehicle wheels.

The connecting flow lines 56, 84, 86 and 88 have therein pilot-operated cut-off valves 150, 152, 154 and 156, respectively, which are adapted to retain their closed positions whenever the pressure differences between the pressures within the high pressure flow lines 18FR, 18FL, 18RR and 18RL upstream of the associated pressure control valves 40, 42, 44 and 46, respectively, and the pressures within the drain flow lines 110, 112, 114 and 116, respectively, are not more than predeterminate values, and to increase their opening degree with the increase in the pressure differences in the range where the differences exceed the predeterminate values. The flow lines 56, 84, 86 and 88 are connected between the associated pressure control valves and the cut-off valves with the flow line 50, 60, 62 and 64 in the pressure control valves on the downstream side of the associated variable flow restrictions by flow lines 158, 160, 162 and 164, respectively. The flow lines 158, 160, 162 and 164 have therein relief valves 166, 168, 170 and 172, respectively, which are adapted to take in as pilot pressures the pressures within the associated flow lines 158, 160, 162 and 164, respectively, upstream thereof, i.e., on the side of the associated connecting flow lines, and to open when the pilot pressures exceed predeterminate values to thereby conduct some oil within the connecting flow lines to the flow lines 50, 60, 62 and 64.

As will be realized, the cut-off valves 150, 152, 154 and 156 may be adapted to retain their closed positions whenever the differences between the pressures within the high pressure flow lines 18FR, 18FL, 18RR and 18RL and the atmospheric pressure are not more than predeterminate values.

The flow lines 48FR and 48FL are connected at their other ends with one end of a low pressure flow line 48F for the front vehicle wheels, while the flow lines 48RR and 48RL are connected at their other ends with one end of a low pressure flow line 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 with the low pressure flow line 48 by a flow line 178. The flow line 178 has therein a relief valve 180 which is adapted to open when its pilot pressure is more than a predeterminate value.

The high pressure flow line 18R and the low pressure flow line 48R are connected with each other by a flow line 188 which has therein a filter 182, a flow restriction 184 and a normally open electromagnetic on-off valve 186 including a solenoid 190 for adjusting the valve opening. The on-off valve 186 is adapted to open when its solenoid 190 is energized and to control the flow rate of the oil flowing therethrough when the energizing electric current is adjusted. The high pressure flow line 18R and the low pressure flow line 48R are additionally connected with each other by a flow line 194 which have therein a pilot-operated on-off valve 192. The on-off valve 192 is adapted to take in as pilot pressures the pressures on both sides of the flow restriction 184 and to remain in its closed position 192a when no substantial pressure difference exists between the pressures on both sides of the flow restriction 184 and to be switched over to its open position 192b when the pressure on the side of the high pressure flow line 18R relative to the flow restriction 184 is substantially higher than the pressure on the side of the low pressure flow line. Thus, the flow restriction 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the embodiment shown, a pressure sensor 197 is connected to the high pressure flow line 18R for detecting the oil pressure Ps within the flow line and similarly a pressure sensor 198 is connected to the low pressure flow line 48R for detecting the oil pressure Pd within the flow line. Pressure sensors 199FR, 199RL, 199RR and 199RL are connected to the connecting flow lines 56, 84, 86 and 88 for detecting the oil pressure within the working fluid chambers 2FR, 2RL, 2RR and 2RL, respectively. A temperature sensor 195 is provided in the reserve tank 4 for detecting the temperature T of the oil within the tank. Compression coil springs 200FR, 200RL, 200RR and 200RL serving as suspension spring are interposed between upper sheets attached to the rod portions of the pistons 108FR, 108RL, 108RR and 108RL incorporated in the actuators and lower sheets secured to the cylinders 106RF, 106RL, 106RR and 106RL, respectively.

Figure 2:
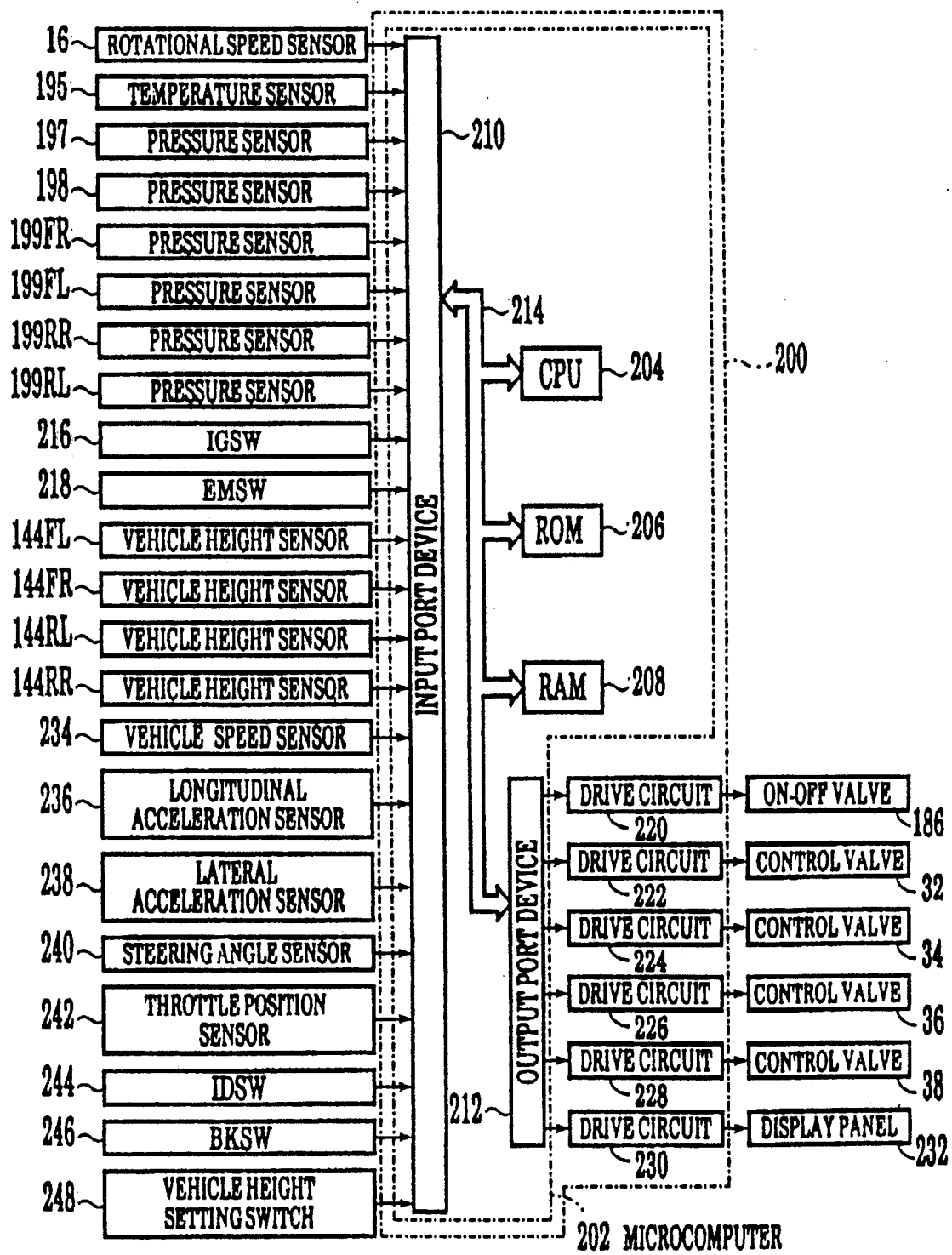
FIG. 2 is a block diagram showing an electric control device of the embodiment shown in FIG. 1.

The electromagnetic on-off valve 186 and the pressure control valves 32, 34, 36 and 38 are controlled by an electric control device 200 shown in FIG. 2. The electric control device 200 includes a microcomputer 202. The microcomputer 202 may, as shown in FIG. 2, be of conventional construction having a CPU (central processing unit) 204, a ROM (read only memory) 206, a RAM (random access memory) 208, an input port device 210, and an output port device 212, all of these being linked with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure flow lines from the pressure sensors 197 and 198, respectively, signals indicative of the pressures Pi (where "i" is "1" for the front left wheel, "2" for the front right wheel, "3" for the rear left wheel, and "4" for the rear right wheel) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, a signal indicative of whether or not an emergency switch (EMSW) 218 is on which is provided in a cabin and is operated by a driver or a passenger, and signals indicative of the vehicle heights Xi (i=1, 2, 3 and 4) at locations corresponding to the front left wheel, the front right wheel, the rear left wheel, and the rear right wheel from the vehicle height sensors 144FL, 144FR, 144RL and 144RR, respectively.

Additionally the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle theta from a steering angle sensor 240, a signal indicative of a throttle opening from a throttle position sensor 242, a signal indicative of whether or not an idle switch (IDSW) 244 is on from the idle switch, a signal indicative of whether or not a brake switch (BKSW) 246 is on from the brake switch, and a signal indicative of whether the mode for controlling the vehicle height set by a vehicle height setting switch 248 is a high mode or a normal mode. The switch 248 is provided in the cabin to be operated by a driver or a passenger according to his or her taste.

The input port device 210 processes the signals input thereinto in a predetermined manner and, under the control of the CPU 204 which is based upon the program stored in the ROM 206, outputs the processed signals to the CPU and the RAM 208. The ROM 206 stores the control flows shown in FIG. 3, FIGS. 8A through 8C and FIGS. 9 through 11, and the maps shown in FIGS. 4 through 7 and FIGS. 12 through 45. The output port device 212, under the control of the CPU 204, outputs a control signal via a drive circuit 220 to the electromagnetic on-off valve 186 and control signals via drive circuits 222, 224, 226 and 228 to the pressure control valves 32, 34, 36 and 38, to be more exact, to the solenoids 58, 78, 80 and 82 in the variable flow restrictions 54, 72, 74 and 76, respectively, and a control signal via a drive circuit 230 to a display panel 232.

Figure 3:
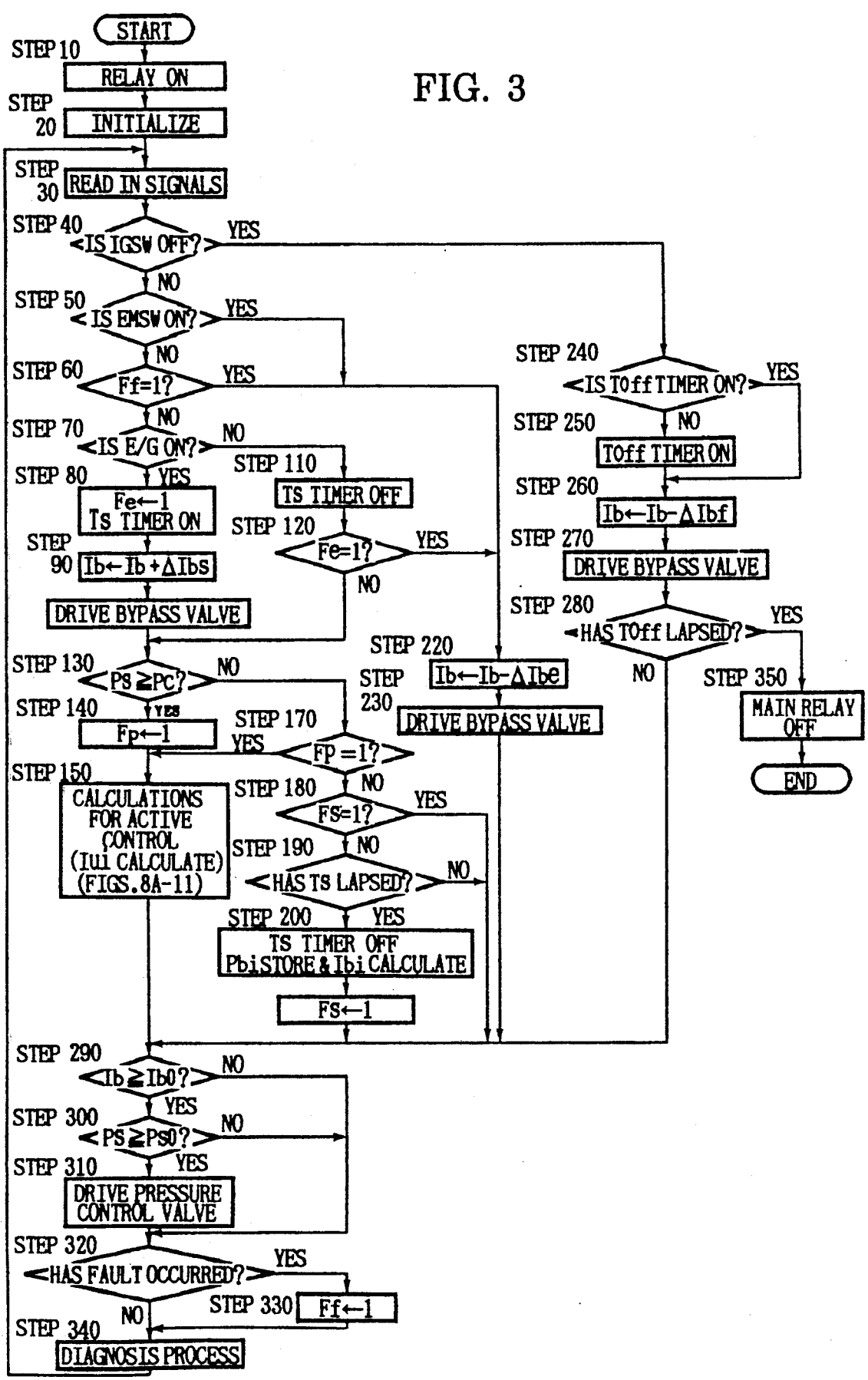
FIG. 3 is a flow chart showing a control flow of a cyclical program carried out by the electric control device shown in FIG. 2.

Referring now to the flow chart shown in FIG. 3, the operation of the embodiment is explained.

In this connection, it is to be noted that the routine of the control flow shown in FIG. 3 is initiated when the ignition switch 216 is turned on. It should also be noted that in the flow chart shown in FIG. 3, a flag Ff concerns whether or not any fault or faults exist anywhere in the hydraulic suspension system and one means that any fault or faults have occurred in the hydraulic suspension system; a flag Fe is concerned with whether or not the engine is running and one means that the engine is running; a flag Fp relates to whether or not the pressure Ps of the oil within the high pressure flow line has ever exceeded a threshold pressure Pc above which the cut-off valves 152, 150, 156 and 154 are completely opened and one means that the pressure Ps has ever exceeded the pressure Pc; and a flag Fs is related to whether or not standby pressures Pbi (i=1, 2, 3 and 4) referred to later have been set for the pressure control valves 34, 32, 38 and 36, and one means that the standby pressures have been set.

In the first step 10, a main relay not shown in the figures is turned on, and then the flow of control passes next to the step 20.

In the step 20, the RAM 208 is cleared of all the information stored therein and all the flags are reset to zero, and then the flow of control passes to the next step 30.

In the step 30, signals are read including the signal indicative of the rotational speed N of the engine 14 detected by the rotational speed sensor 16, the signal indicative of the temperature T of the oil detected by the temperature sensor 195, signals indicative of the pressures Ps and Pd within the high pressure and the low pressure flow line detected by the pressure sensors 197 and 198, respectively, the signals indicative of the pressures Pi within the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle theta detected by the steering angle sensor 240, the signal indicative of the throttle opening detected by the throttle position sensor 242, the signal indicative of whether or not the idle switch 244 is on, the signal indicative of whether or not the brake switch 246 is on, and the signal indicative of whether the mode for controlling the vehicle height set by the vehicle height setting switch 248 is the high mode or the normal mode, and then the flow of control passes next to the step 40.

In the step 40, a decision is made as to whether or not the ignition switch is off. If a decision is made that the ignition switch is off, then the flow of control is transferred to the step 240, and if a decision is made that the ignition switch is on, then the flow of control passes next to the step 50.

In the step 50, a decision is made as to whether or not the emergency switch is on. If the a decision is made that the emergency switch is on, then the flow of control is transferred to the step 220, and if a decision is made that the emergency switch is not on, then the flow of control passes next to the step 60.

In the step 60, a decision is made as to whether or not the flag Ff is one. If a decision is made that the flag Ff is one, then the flow of control is transferred to the step 220, and if a decision is made that the flag Ff is not one, then the flow of control proceeds to the next step 70.

In the step 70, a decision is made as to whether or not the engine is running by determining whether or not the rotational speed N of the engine which was detected by the rotational speed sensor 16 and read in in the step 30 is more than a predeterminate value. If a decision is made that the engine is not running, then the flow of control is transferred to the step 110, and if a decision is made that the engine is running, then the flow of control passes next to the step 80.

It is to be understood that the decision as to whether or not the engine is running may be made by, for example, determining whether or not the voltage of the electricity generated by an alternator, not shown, which is driven by the engine is higher than a predeterminate value.

In the step 80, the flag Fe is set to one, and a timer is started which counts the period of time Ts between the time point when the engine is started and the time point when the standby pressures Pbi are set for the pressure control valves 34, 32, 38 and 36 in the step 200 referred to later, and then the flow of control passes next to the step 90. In the event, however, where the flag Fe has already been set to one, it is left as it is, and in the case where the timer has already been operated, it continues to count.

Figure 4:
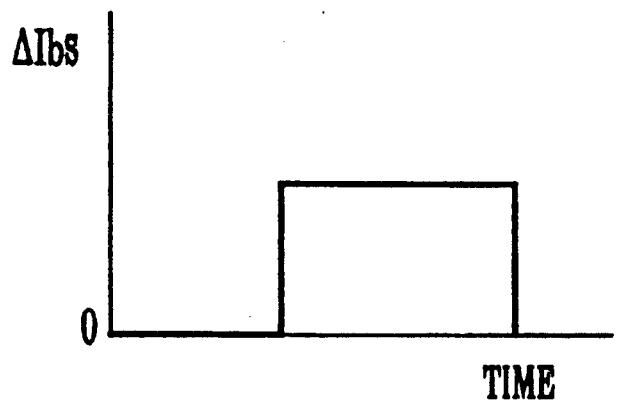
FIGS. 4 through 6 are graphs showing the maps utilized in calculating the electric current Ib which is supplied to the bypass valve at the stage when the control system is started, when the control system is stopped under a normal operational condition, and when the system is stopped under an abnormal operational condition, respectively.

In the step 90, electric current Ib which is supplied to the solenoid 190 within the electromagnetic on-off valve 186 included in the bypass valve 196 is calculated based upon the map stored in ROM 206 which corresponds to the graph shown in FIG. 4 according to the following equation, and then the flow of control passes next to the step 100.

$$Ib = Ib + \text{delta } Ibs$$

In the step 100, the electric current Ib calculated in the step 90 is supplied to the solenoid 190 in the electromagnetic on-off valve 186 to shift the bypass valve 196 toward its fully closed position, and then the flow of control proceeds to the next step 130.

In the step 110, the Ts timer is stopped, and then the flow of control passes next to the step 120. In the event, however, where the Ts timer is not operated, it is left as it is.

In the step 120, a decision is made as to whether or not the flag Fe is one. If a decision is made that the flag Fe is one, i.e., the engine has been stopped after it was once started, then the flow of control is transferred to the step 220, and if a decision is made that the flag Fe is not one, i.e., the engine has not yet been started, then the flow of control passes next to the step 130.

In the step 130, a decision is made as to whether or not the pressure Ps within the high pressure flow line is equal to or more than the threshold value Pc. If a decision is made that Ps is not equal to or is not higher than Pc, then the flow of control is transferred to the step 170, and if a decision is made that Ps is equal to or higher than Pc, then the flow of control passes next to the step 140.

In the step 140, the flag Fp is set to one, and next the flow of control passes to the step 150.

In the step 150, as will be explained in detail later referring to FIG. 8A and the followings figures, in order to control the comfortability of the vehicle, the attitude of the vehicle body and the US-OS characteristics, the calculations for active controls are performed based upon the data read in in the step 30 to calculate the electric currents Iui which are supplied to the solenoids 78, 58, 82 and 80 incorporated within the variable flow restrictions 72, 54, 76 and 74 in the pressure control valves, and then the flow of control is transferred to the step 290.

In the step 170, a decision is made as to whether or not the flag Fp is one. If a decision is made that the flag Fp is one, i.e., the pressure Ps of the oil within the high pressure flow line has been decreased to a level lower than the threshold pressure Pc after it was increased to a level equal to or higher than the threshold value, then the flow of control passes to the step 150, and if a decision is made that the flag Fp is not one, i.e., the pressure Ps has not yet been increased to a level equal to or higher than the threshold pressure Pc, then the flow of control passes next to the step 180.

In the step 180, a decision is made as to whether or not the flag Fs is one. If a decision is made that the flag Fs is one, then the flow of control passes to the step 290, and if a decision is made that the flag Fs is not one, then the flow of control passes next to the step 190.

In the step 190, a decision is made as to whether or not the time Ts has elapsed. If a decision is made that the time Ts has not yet elapsed, then the flow of control passes to the step 290, and if a decision is made that the time Ts has elapsed, then the flow of control passes next to the step 200.

Figure 7:
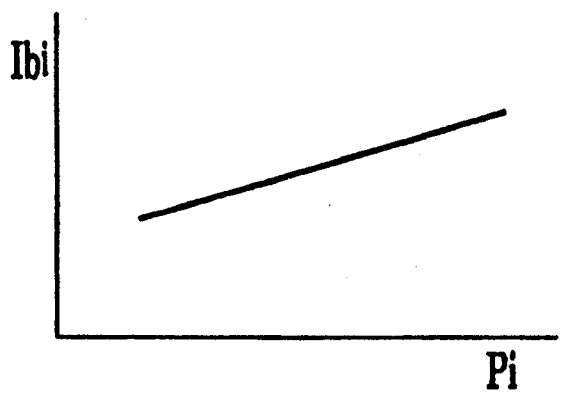
FIG. 7 is a graph showing the relationship between the pressures Pi within the working fluid chambers in the actuators and the electric currents Ibi supplied to the pressure control valves.

In the step 200, the Ts timer is stopped, and according to the map stored in the ROM 206 which corresponds to the graph shown in FIG. 7, the values of the electric currents Ibi (i=1, 2, 3 and 4) are calculated which are supplied to the solenoids 78, 58, 82 and 80 incorporated within the variable flow restrictions 72, 54, 76 and 74 in the pressure control valves 34, 32, 38 and 36 so that the pressures within the connecting flow lines 84, 56, 88 and 86 between the associated pressure control valves and the associated cut-off valves may be controlled to the respective standby pressures Pbi, i.e., the pressures which are substantially equal to the pressures Pi within the working fluid chambers 2FL, 2FR, 2RL and 2RR that are detected by the associated pressure sensors, and then the flow of control passes next to the step 210.

In the step 210, the flag Fs is set to one, and then the flow of control is transferred to the step 290.

Figure 6:
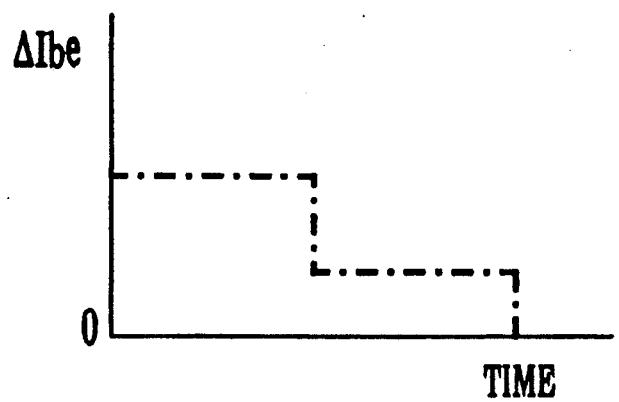

In the step 220, based upon the map which corresponds to the graph shown in FIG. 6 and is stored in the ROM 206, the electric current Ib which is supplied to the solenoid 190 incorporated within the electromagnetic on-off valve 186 included in the bypass valve 196 is calculated according to the following equation, and then the flow of control passes next to the step 230.

$$Ib = Ib - \text{delta } Ibe$$

In the step 230, the electric current Ib calculated in the step 220 is supplied to the solenoid 190 to shift the bypass valve 196 towards its full open position, and then the flow of control is transferred to the step 290.

In the step 240, a decision is made as to whether or not a timer is on which concerns the period of time Toff, between the time point when the ignition switch is turned off and the time point when the main relay is switched off. If a decision is made that the Toff timer is on, then the flow of control passes next to the step 260, and if a decision is made that the Toff timer is not on, then the flow of control passes next to the step 250.

In the step 250, the Toff timer is started to count, and then the flow of control passes next to the step 260.

Figure 5:
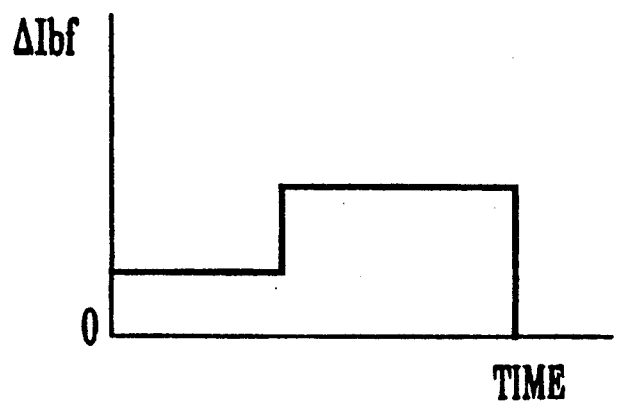

In the step 260, based upon the map which corresponds to the graph shown in FIG. 5 and is stored in the ROM 206, the electric current Ib which is supplied to the solenoid 190 incorporated in the electromagnetic on-off valve 186 is calculated according to the following equation, and then the flow of control proceeds to the next step 270.

$$Ib = Ib - \text{delta } Ibf$$

In the step 270, the electric current Ib calculated in the step 260 is supplied to the solenoid 190 in the electromagnetic on-off valve 186 to shift the bypass valve 196 towards its full open position, and then the flow of control passes next to the step 280.

In the step 280, a decision is made as to whether or not the time Toff has elapsed. If a decision is made that the time Toff has elapsed, then the flow of control is transferred to the step 350, and if a decision is made that the time Toff has not yet elapsed, then the flow of control passes to the next step 290.

In the step 290, a decision is made as to whether or not the electric current Ib calculated in the step 90, 220 or 260 is not less than a reference value Ibo. If a decision is made that the current Ib is less than Ibo, then the flow of control is transferred to the step 320, and if a decision is made that the current Ib is not less than Ibo, then the flow of control passes next to the step 300.

In the step 300, a decision is made as to whether or not the pressure Ps within the high pressure flow line read in in the step 30 is not less than a reference value Pso which is lower than the threshold value Pc. If a decision is made that Ps is less than Pso, then the flow of control passes to the step 320, and if a decision is made that Ps is not less than Pso, then the flow of control passes next to the step 310.

In the step 310, the electric currents Ibi calculated in the step 200 or the electric currents Iui calculated in the step 150 are supplied to the solenoid 78, 58, 82 and 80 incorporated in the variable flow restrictions included in the associated pressure control valves so that the valves are driven to adjust the pressures within the working fluid chambers in the associated actuators, and the flow of control proceeds to the next step 320.

In the step 320, a decision is made as to whether or not any fault or faults exist anywhere in the control system. If a decision is made that no fault exists, then the flow of control passes to the step 340, and if a decision is made that an fault or faults exist, then the flow of control passes next to the step 330.

In the step 330, the fault flag Ff is set to one, and then the flow of control proceeds to the next step 340.

In the step 340, a diagnostic process is effected with respect to the various parts in the control system. If any trouble or troubles such as faults are found, then code numbers showing their positions are indicated on the display panel 232, and if no trouble is found, then the flow of control returns to the step 30 without indicating any code number on the display panel, and thereafter the steps 30 through 340 described above are repeated.

In the step 350, the main relay is turned off to finish the control flow shown in FIG. 3 and to stop supplying electricity to the electric control device 200 shown in FIG. 2.

It is to be noted that the pressure controls conducted by the bypass valve when the system is started and stopped do not form a principal part of the present invention, and references may be made for the details concerning these pressure controls to the Japanese Patent Application Nos. Showa 63-307189 and Showa 63-307190 which were filed by an applicant the same as one of the assignees of the present application. As will be realized by those skilled in the art, although each cut-off valve is provided between the associated pressure control valve and the actuator in the mentioned embodiment, it may be incorporated on the opposite side from the actuator relative to the pressure control valve.

Referring next to the FIGS. 8A through 8C and FIGS. 9 through 45, the calculations for the active control conducted in the above-mentioned step 150 will be explained.

Figure 12:
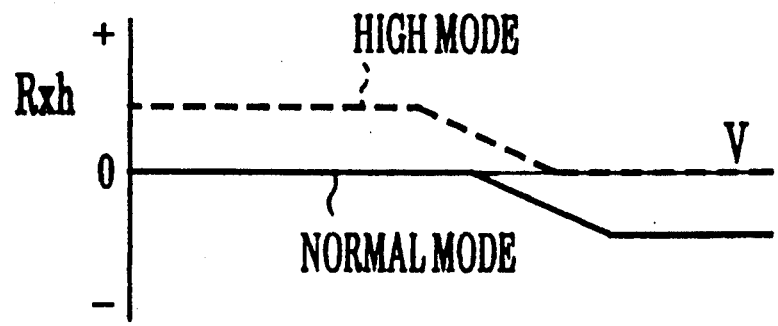
FIG. 12 is a graph showing the relationship between a vehicle speed V and a desired displacement Rxh of heave.
Figure 13:
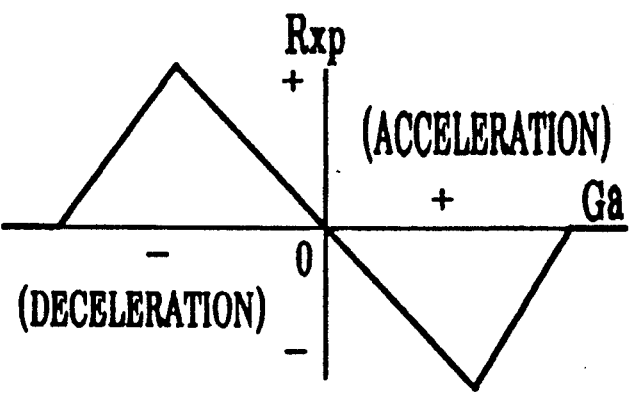
FIG. 13 is a graph showing the relationship between a longitudinal acceleration Ga and a desired displacement Rxp of pitch.
Figure 14:
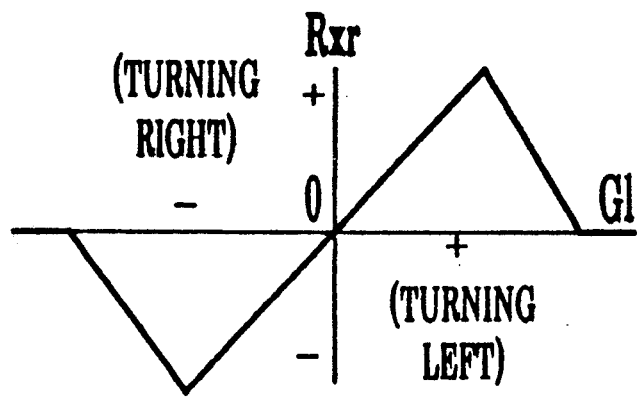
FIG. 14 is a graph showing the relationship between a lateral acceleration Gl and a desired displacement Rxr of roll.

In the step 400, based upon the maps corresponding to the graphs shown in FIGS. 12 through 14, desired displacement values Rxh, Rxp and Rxr of heave, pitch and roll, respectively, for attaining a desired attitude of the vehicle body are calculated, and then the flow of control passes next to the step 410.

It is to be noted that in FIG. 12, the solid line shows a pattern wherein the mode for controlling vehicle heights set by the vehicle height setting switch is the normal mode and the dotted line shows a pattern wherein the mode is the high mode.

In the step 410, based upon the vehicle heights $X_1$, $X_2$, $X_3$ and $X_4$ at the locations corresponding to the front left, front right, rear left, and rear right vehicle wheels read in in the step 30, calculations for transferring the displacements into values of heave "Xxh", pitch "Xxp", roll "Xxr" and warp "Xxw" are carried out according to the following equations, and thereafter the flow of control passes next to the step 420.

$$Xxh = (X_1+X_2)+(X_3+X_4)$$

$$Xxp = -(X_1+X_2)+(X_3+X_4)$$

$$Xxr = (X_1-X_2)+(X_3-X_4)$$

$$Xxw = (X_1-X_2)-(X_3-X_4)$$

In the step 420, the differences of the displacements of the respective modes are calculated according to the following equations, and next the flow of control passes to the step 430.

$$Exh = Rxh - Xxh$$

$$Exp = Rxp - Xxp$$

$$Exr = Rxr - Xxr$$

$$Exw = Rxw - Xxw$$

In this connection, Rxw may be zero, or Xxw calculated in the step 410 just after the control system has been started to operate or the average value of Xxws calculated in the last few cycles. If the absolute value of Exw is equal to or less than $W_1$ which is a positive constant, Exw is then set to zero.

Figure 9:
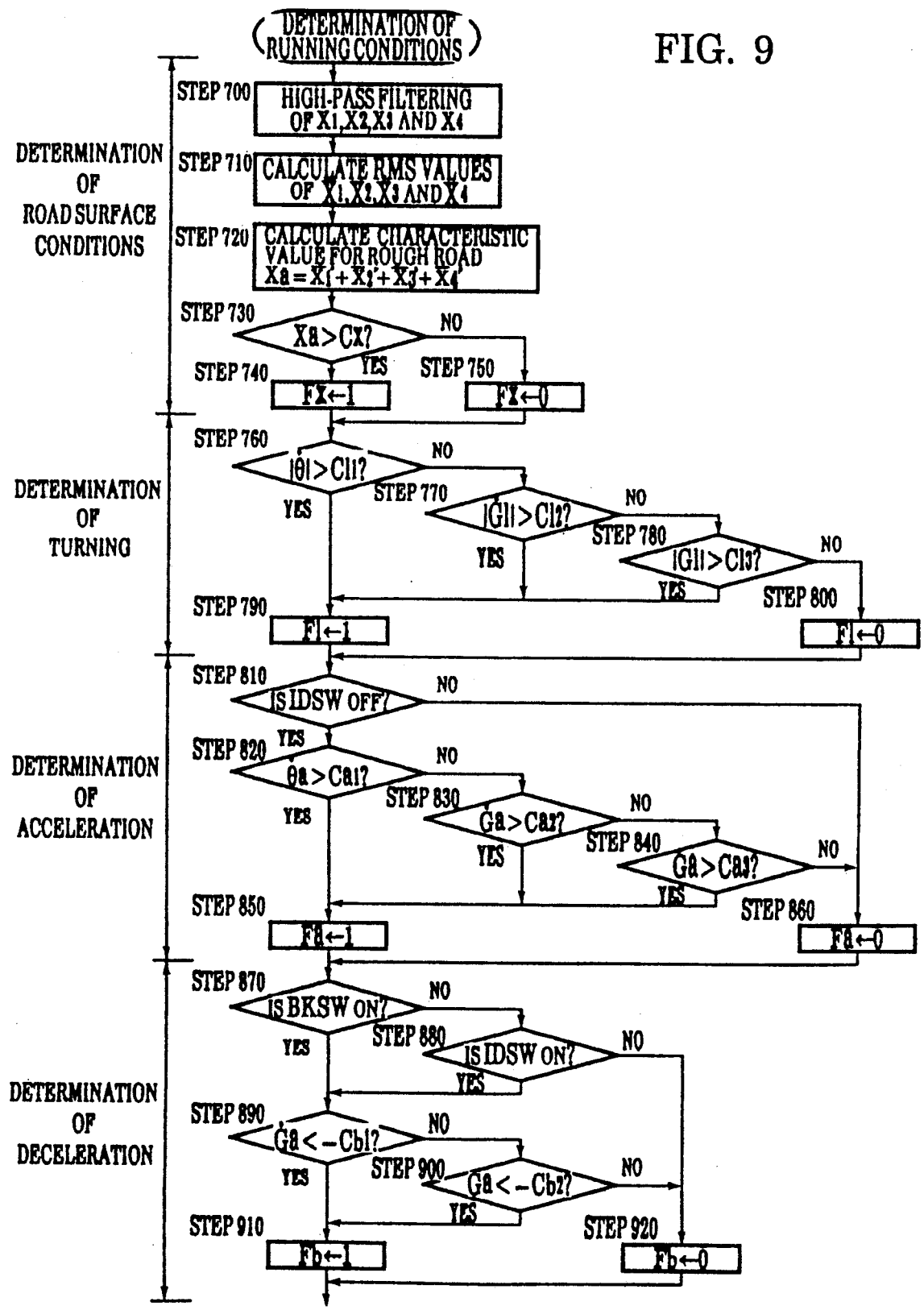
FIG. 9 is a flow chart showing the routine for determining the running conditions conducted in the step 430 in the flow chart shown in FIG. 8A.

In the step 430, as will be explained in detail later referring to FIG. 9, determinations of the running conditions of the vehicle, i.e., the determinations of the road surface conditions, turning, acceleration and deceleration are conducted, and then the flow of control passes next to the step 440.

Figure 10:
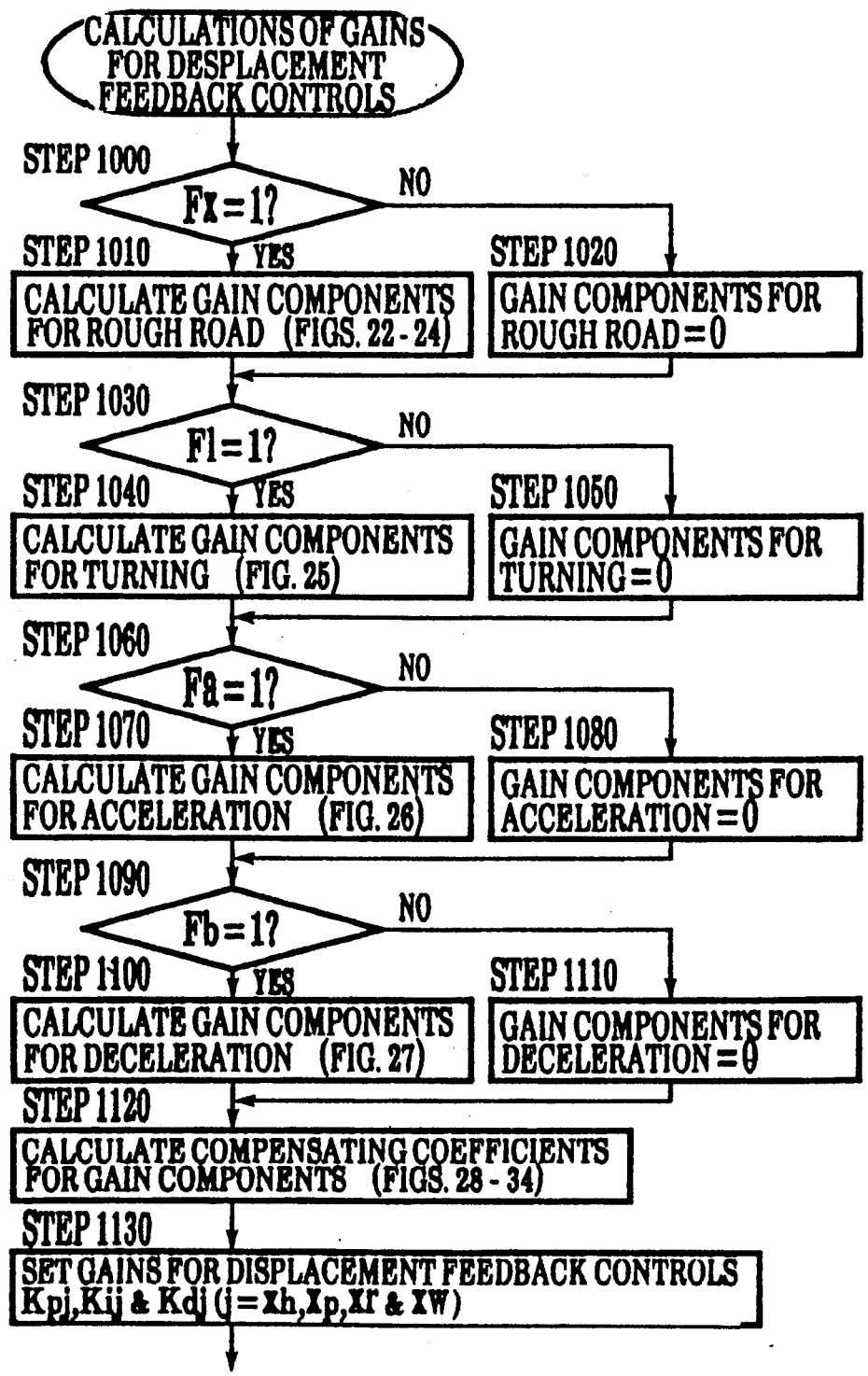
FIG. 10 is a flow chart showing the routine for calculating the gains for displacement feedback controls performed in the step 440 in the flow chart shown in FIG. 8A.

In the step 440, as will also be explained in detail later referring to FIG. 10, based upon the results of the determinations conducted in the step 430, the gains Kpj, Kij and Kdj (j=xh, xp, xr and xw) for displacement feedback controls are calculated, and next the flow of control passes to the step 450.

In the step 450, calculations for PID compensations in displacement feedback controls are conducted according to the following equations, and thereafter the flow of control passes next to the step 460.

$$Cxh = Kpxh \cdot Exh + Kixh \cdot Ixh(n) + Kdxh \{Exh(n) - Exh(n-n_1)\}$$

$$Cxp = Kpxp \cdot Exp + Kixp \cdot Ixp(n) + Kdxp \{Exp(n) - Exp(n-n_1)\}$$

$$Cxr = Kpxr \cdot Exr + Kixr \cdot Ixr(n) + Kdxr \{Exr(n) - Exr(n-n_1)\}$$

$$Cxw = Kpxw \cdot Exw + Kixw \cdot Ixw(n) + Kdxw \{Exw(n) - Exw(n-n_1)\}$$

It should be noted that in the above equations, Ej(n) (j=xh, xp, xr and xw) are the present values of Ej, and Ej(n−$n_1$) are values of Ej obtained $n_1$ cycles before. Assuming Ij(n) and Ij(n−1) are values of Ij of the present cycle and one cycle before, respectively, and Tx is a time constant, they have the following relationship.

$$Ij(n) = Ej(n) + Tx \cdot Ij(n-1)$$

If the absolute values of Ij exceed Ijmax which are predetermined values, then Ij are set to Ijmax. Further, the gains Kpj, Kij, Kdj (j=xh, xp, xr and xw) calculated in the step 440 are proportional constants, integral constants and differential constants, respectively.

In the step 460, calculations for reversely transferring the displacement modes are carried out according to the following equations, and then the flow of control proceeds to the step 470.

$$Px_1 = \tfrac{1}{4} \cdot Kx_1(Cxh - Cxp + Cxr + Cxw)$$

$$Px_2 = \tfrac{1}{4} \cdot Kx_2(Cxh - Cxp - Cxr - Cxw)$$

$$Px_3 = \tfrac{1}{4} \cdot Kx_3(Cxh + Cxp + Cxr - Cxw)$$

$$Px_4 = \tfrac{1}{4} \cdot Kx_4(Cxh + Cxp - Cxr + Cxw)$$

where $Kx_1$, $Kx_2$, $Kx_3$ and $Kx_4$ are proportional constants.

Figure 15:
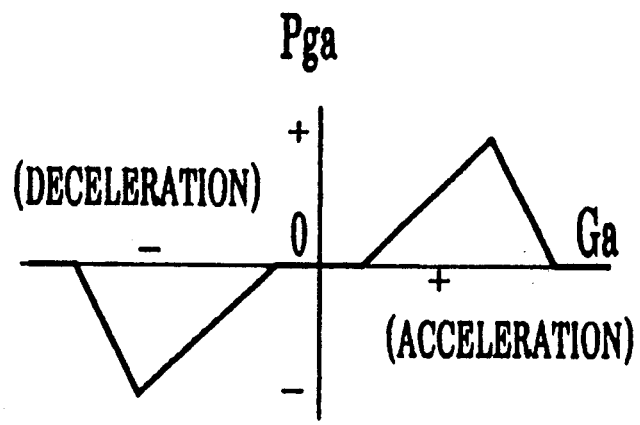
FIG. 15 is a graph showing the relationship between a longitudinal acceleration Ga and a pressure compensating value Pga.
Figure 16:
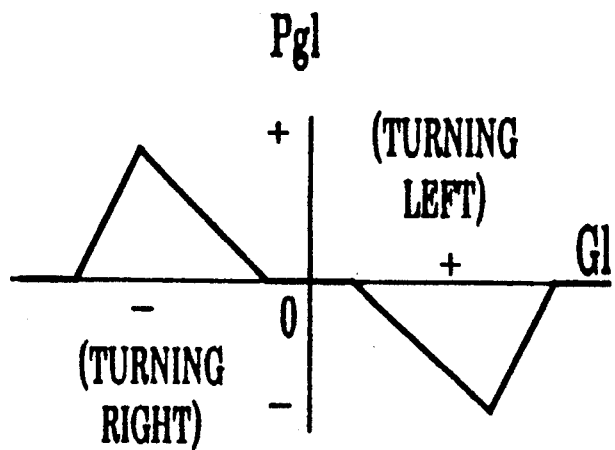
FIG. 16 is a graph showing the relationship between a lateral acceleration Gl and a pressure compensating value Pgl.
Figure 18:
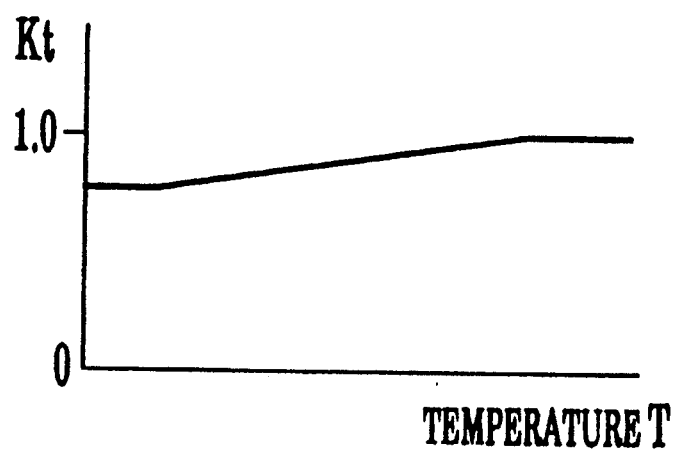
FIG. 18 is a graph showing the relationship between the temperature T of oil and a compensating coefficient Kt.

In the step 470, based upon the maps corresponding to the graphs shown in FIGS. 15 and 18, pressure compensating values Pga and Pgl in the longitudinal and lateral directions, respectively, are calculated, and then the flow of control passes next to the step 480.

Figure 11:
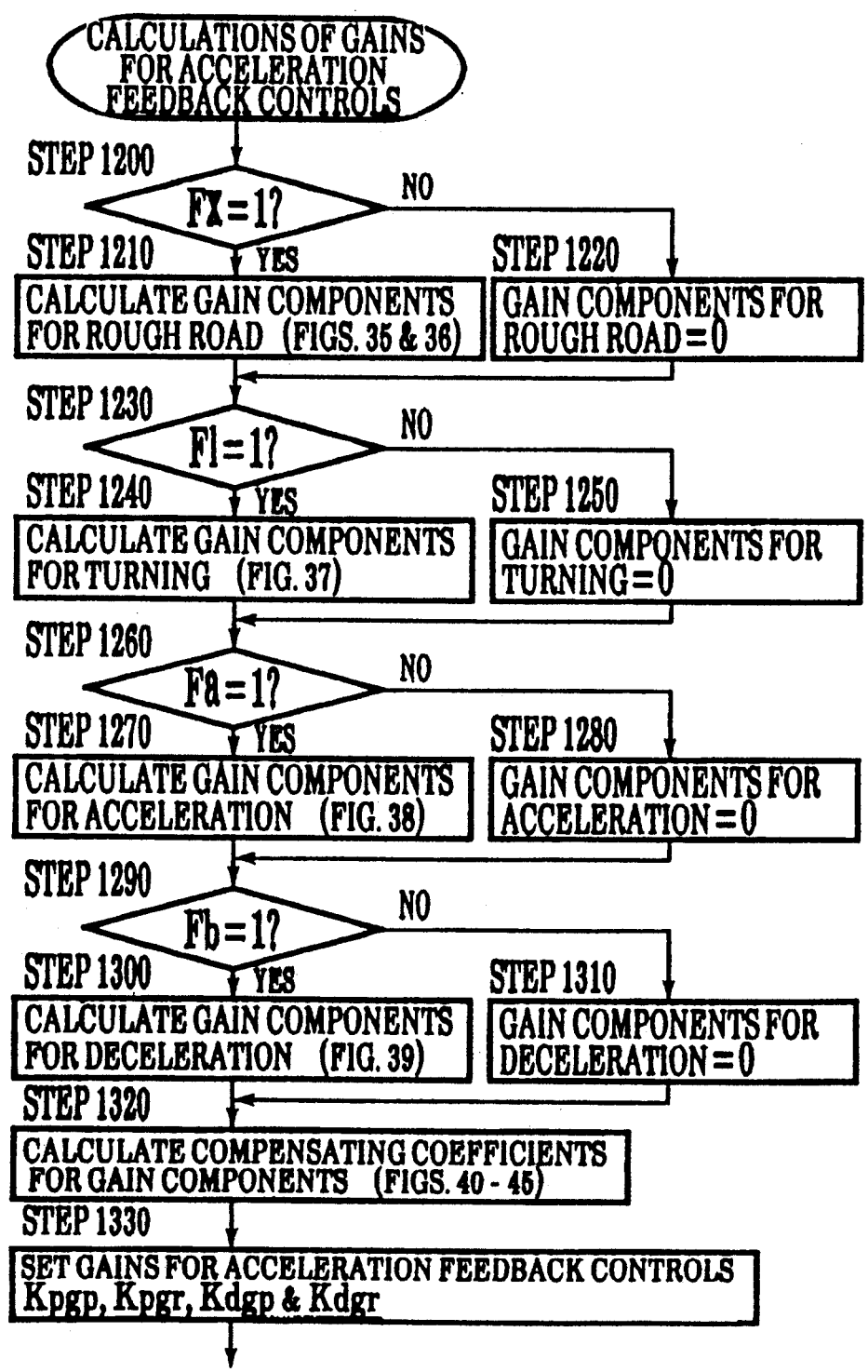
FIG. 11 is a flow chart showing the routine for calculating the gains for acceleration feedback controls carried out in the step 480 in the flow chart shown in FIG. 8B.

In the step 480, as will be explained in detail later referring to FIG. 11, the gains Kpm and Kdm (m=gp and gr) for acceleration feedback controls are calculated, and next the flow of control passes to the step 490.

In the step 490, calculations for PD compensations on pitch (Cgp) and roll (Cgr) in acceleration feedback control are conducted according to the following equations, and thereafter the flow of control proceeds to the next step 500.

$$Cgp = Kpgp \cdot Pga + Kdgp\{Pga(n) - Pga(n - n_1)\}$$

$$Cgr = Kpgr \cdot Pgl + Kdgr\{Pgl(n) - Pgl(n - n_1)\}$$

In the equations, Pga(n) and Pgl(n) are present Pga and Pgl, respectively, and $Pga(n - n_1)$ and $Pgl(n - n_1)$ are Pga and Pgl, respectively, at the cycle which is $n_1$ cycles before. Kdgp and Kdgr are the proportional constants calculated in the step 450, while Kdgp and Kdgr are the differential constants calculated in the step 480.

Figure 17:
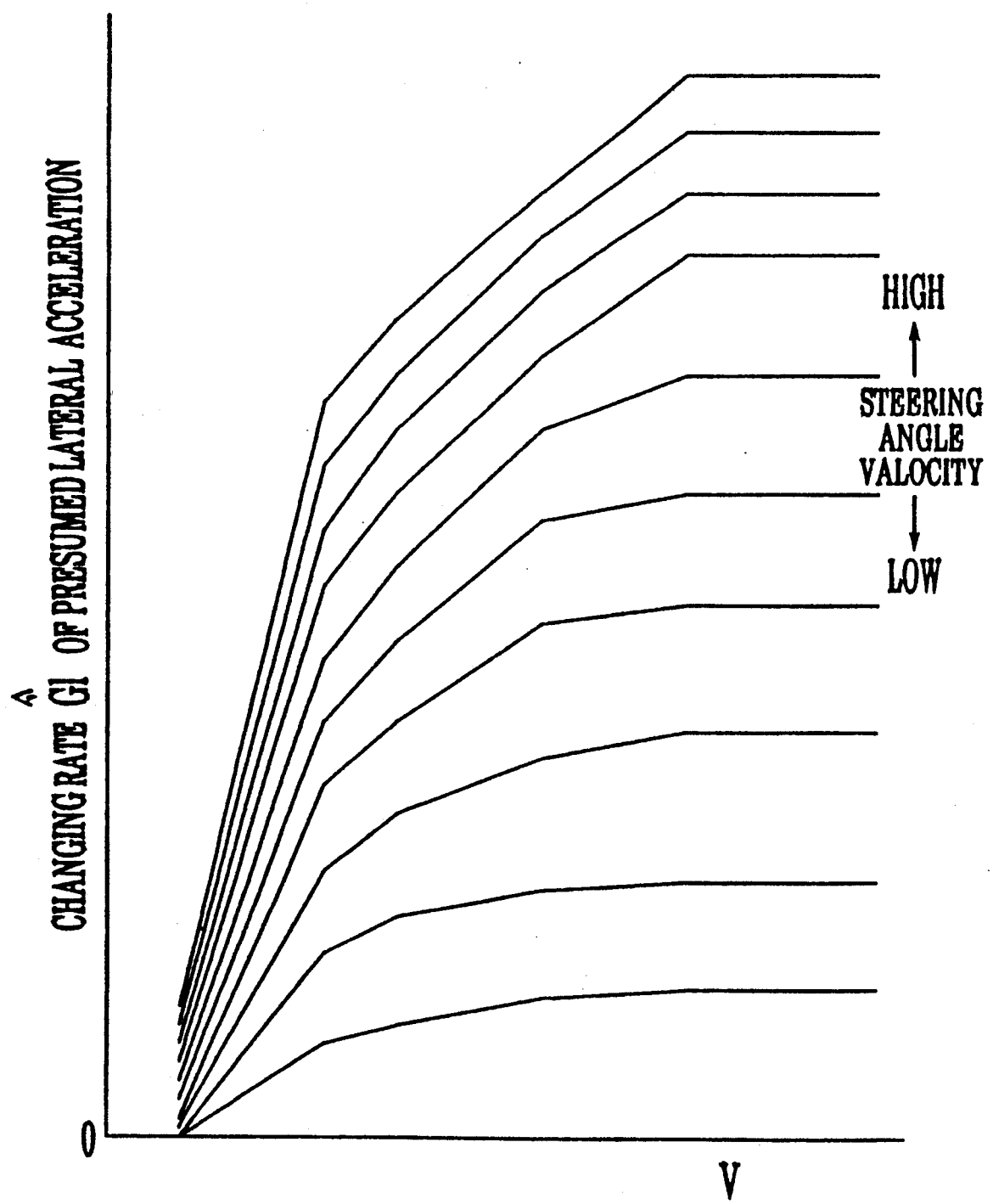
FIG. 17 is a graph showing the relationship between a vehicle speed V, a steering angle velocity and the changing rate $\dot{G}l$ of a presumed lateral acceleration.

In the step 500, letting theta' represent a steering angle read in in the step 30 one cycle before in the flow chart shown in FIG. 17, steering angle velocity delta theta is calculated according to the following equation:

delta theta = theta − theta' and based upon the map corresponding to the graph shown in FIG. 17 and from the steering angle velocity calculated above and a vehicle speed V, the changing rate of the presumed lateral acceleration "$\overset{A}{Gl}$" is calculated, and thereafter the flow of control passes next to the step 510.

In the step 510, calculations for reversely transferring acceleration modes are performed according to the following equations, and next the flow of control proceeds to the step 520.

$$Pg_1 = Kg_1/4 \cdot (-Cgp + K_2f \cdot Cgr + K_1f \cdot \overset{A}{Gl})$$

$$Pg_2 = Kg_2/4 \cdot (-Cgp - K_2f \cdot Cgr - K_1f \cdot \overset{A}{Gl})$$

$$Pg_3 = Kg_3/4 \cdot (Cgp + K_2r \cdot Cgr + K_1r \cdot \overset{A}{Gl})$$

$$Pg_4 = Kg_4/4 \cdot (Cgp - K_2r \cdot Cgr - K_1r \cdot \overset{A}{Gl})$$

In the equations $Kg_1$, $Kg_2$, $Kg_3$ and $Kg_4$ are proportional constants, and $K_1f$, $K_1r$, $K_2f$ and $K_2r$ are constants serving as distributing gains between front and rear vehicle wheels.

In the step 520, based upon the pressures Pbi stored in RAM 208 in the step 200 and the calculated values obtained in the steps 460 and 510, desired controlling pressures Pui of the pressure control valves are calculated according to the following equations, and thereafter the flow of control proceeds to the step 530.

$$Pui = Pxi + Pgi + Pbi \ (i = 1, 2, 3 \text{ and } 4)$$

In the step 530, desired electric currents supplied to the pressure control valves are calculated according to the following equations, and then the flow of control passes next to the step 540.

$$I_1 = Ku_1 \cdot Pu_1 + Kh(Psr - Ps) - Kl \cdot Pd - \text{alpha}$$

$$I_2 = Ku_2 \cdot Pu_2 + Kh(Psr - Ps) - Kl \cdot Pd - \text{alpha}$$

$$I_3 = Ku_3 \cdot Pu_3 + Kh(Psr - Ps) - Kl \cdot Pd$$

$$I_4 = Ku_4 \cdot Pu_4 + Kh(Psr - Ps) - Kl \cdot Pd$$

It is to be noted that $Ku_1$, $Ku_2$, $Ku_3$, $Ku_4$ are proportional constants for corresponding vehicle wheels; Kh and Kl are compensating coefficients for pressures within the high pressure and the low pressure flow lines, respectively; alpha is a compensating constant between the front and rear vehicle wheels; and Psr is a standard pressure within the high pressure flow line.

In the step 540, based upon the temperature T of the oil read in in the step 30 and the map corresponding to the graph shown during FIG. 18, a coefficient Kt for compensating for temperature is calculated; the calculations for compensating the desired electric currents for temperature are effected according to the following equations; and then the flow of control passes next to the step 550.

$$Iti = Kt \cdot Ii \ (i = 1, 2, 3 \text{ and } 4)$$

In the step 550, an electric current warp, i.e., a warp of the electric current values about the longitudinal axis of the vehicle body, is calculated according to the following equation, and thereafter the flow of control proceeds to the step 560.

$$Iw = (It_1 - It_2) - (It_3 - It_4)$$

Figure 19:
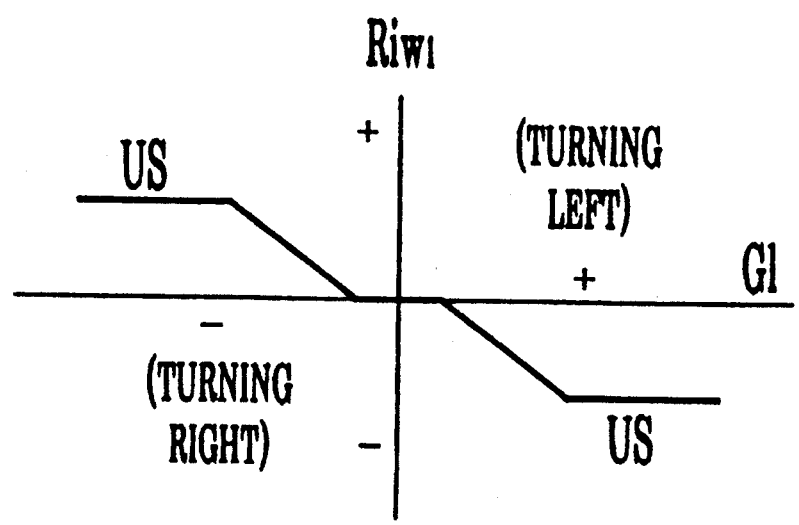
FIG. 19 is a graph showing the relationship between a lateral acceleration Gl and the first controlling quantity $Riw_1$ for electric current warp.

In the step 560, the first controlling quantity $Riw_1$ for electric current warp is calculated based upon the map corresponding to the graph shown in FIG. 19, and then the flow of control passes next to the step 570.

Figure 20:
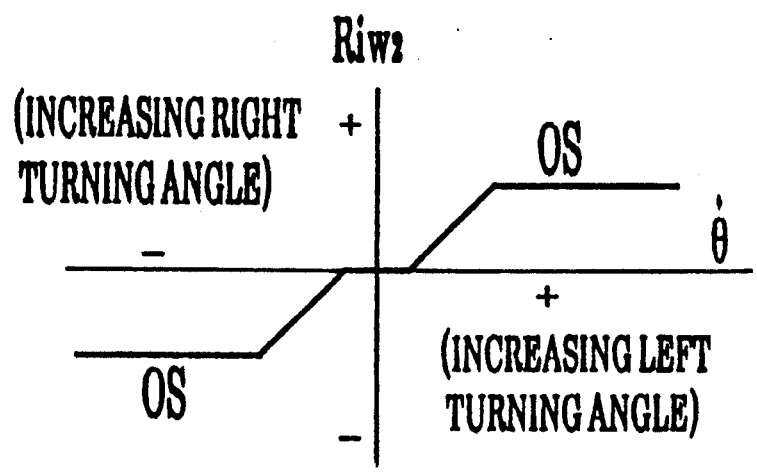
FIG. 20 is a graph showing the relationship between a steering angle velocity $\dot{\theta}$ and the second controlling quantity $Riw_2$ for electric current warp.

In the step 570, the second controlling quantity $Riw_2$ for electric current warp is calculated based upon the map corresponding to the graph shown in FIG. 20, and then the flow of control passes to the next step 580.

In the step 580, the front wheels load Wf is calculated according to the following equation, and then the flow of control proceeds to the next step 590.

$$Wf = Kif(Iu_1 + Iu_2) + 2Ksf \cdot Xsf$$

In the equation, Kif is a proportional constant; $Iu_1$ and $Iu_2$ are the final desired electric currents for the front left and the front right vehicle wheels, respectively, calculated in the last step 660 which is referred to later; Ksf is the average value of the spring rates of the front left and the front right suspension springs including the accumulators 132 and 134; and Xsf is the average value of the vehicle heights $X_1$ and $X_2$ at the locations corresponding to the front left and the front right vehicle wheels, respectively.

In the step 590, the rear wheels load Wr is calculated according to the following equation, and then the flow of control proceeds to the next step 600.

$$Wr = Kir(Iu_3 + Iu_4) + 2Ksr \cdot Xsr$$

In the equation, Kir is a proportional constant; $Iu_3$ and $Iu_4$ are the final desired electric currents for the rear left and the rear right vehicle wheels, respectively, calculated in the last step 660; Ksr is the average value of the spring rates of the rear left and the rear right suspension springs including the accumulators 136 and 138; and Xsr is the average value of the vehicle heights $X_3$ and $X_4$ at the locations corresponding to the rear left and the rear right vehicle wheels, respectively.

In the step 600, based upon the wheels loads Wf and Wr calculated in the steps 580 and 590, a ratio K for distributing load between the front and the rear vehicle wheels is calculated according to the following equation, and then the flow of control passes next to the step 610.

$$K = Wf/Wr$$

Figure 21:
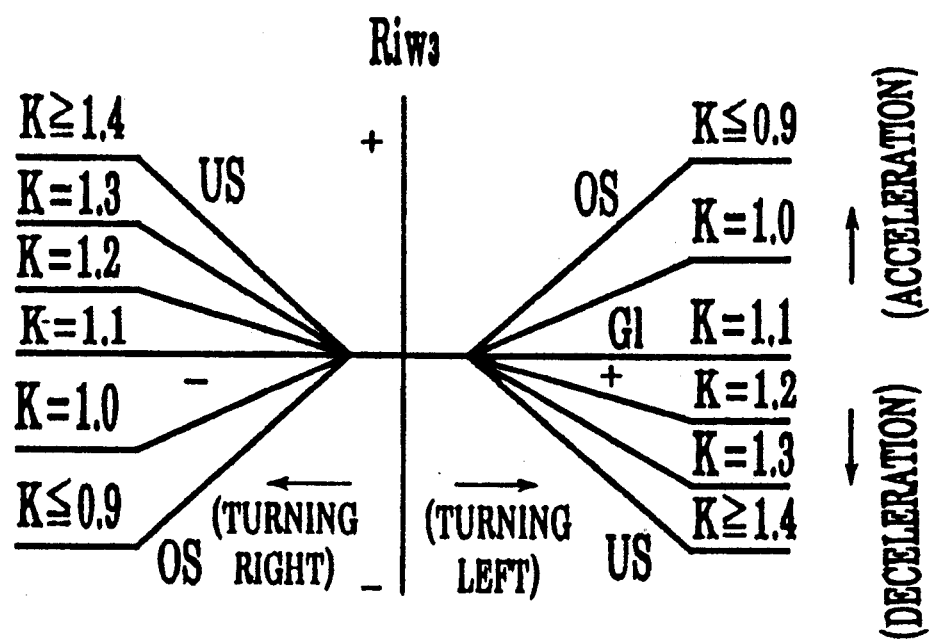
FIG. 21 is a graph showing the relationship among a lateral acceleration Gl, load distributing ratio K between the front and the rear vehicle wheels, and the third controlling quantity $Riw_3$ for electric current warp.

In the step 610, the third controlling quantity $Riw_3$ for electric current warp is calculated based upon the map corresponding to the graph shown in FIG. 21, and thereafter the flow of control is transferred to the step 620.

In the step 620, the sum of the controlling quantities for electric current warp calculated in the steps 560, 570 and 610 is calculated according to the following equation, and then the flow of control passes next to the step 630.

$$Riw = Kw_1 \cdot Riw_1 + Kw_2 \cdot Riw_2 + Kw_3 \cdot Riw_3$$

In the equation, $Kw_1$, $Kw_2$ and $Kw_3$ are proportional constants.

In the step 630, letting Riw denote a desired electric current warp, a difference of the electric current warp is calculated according to the following equation, and next the flow of control proceeds to the step 640.

$$Eiw = Riw - Iw$$

In the above equation the desired electric current warp Riw may be zero.

In the step 640, letting Kiwp represent a proportional constant, a desired controlling value of the electric current warp is calculated according to the following equation, and then the flow of control passes to the next step 650.

$$Eiwp = Kiwp \cdot Eiw$$

In the step 650, calculations for reversely transferring the electric current warp are carried out according to the following equations, and thereafter the flow of control is transferred to the next step 660.

$$Iw_1 = Eiwp/4$$

$$Iw_2 = -Eiwp/4$$

$$Iw_3 = -Eiwp/4$$

$$Iw_4 = Eiwp/4$$

In the step 660, based upon the values obtained by the calculations conducted in the steps 540 and 650, final desired electric currents Iui supplied to the pressure control valves are calculated according to the following equations, and then the flow of control is transferred to the step 290 shown in FIG. 3.

$$Iui = Iti + Iwi \ (i = 1, 2, 3 \text{ and } 4)$$

Next, with reference to the flow chart shown in FIG. 9, the routine for determining the running conditions conducted in the step 430 in the flow chart shown in FIG. 8A will be explained.

In the step 700, high pass filterings are conducted to eliminate the components lower than a predeterminate frequency from the vehicle heights $X_1$, $X_2$, $X_3$ and $X_4$ read in during the step 30 in the past certain number of cycles, and then the flow of control passes next to the step 710.

In the step 710, the RMS (root-mean-square) values of the high pass filtered vehicle heights $X_1'$, $X_2'$, $X_3'$ and $X_4'$ are calculated to obtain the effective values $\overline{X_1}'$, $\overline{X_2}'$, $\overline{X_3}'$ and $\overline{X_4}'$ of the vibratory components, and then the flow of control passes to the next step 720.

In the step 720, a characteristic value Xa for rough road is calculated according to the following equation, and thereafter the flow of control passes to the next step 730.

$$Xa = \overline{X_1}' + \overline{X_2}' + \overline{X_3}' + \overline{X_4}'$$

It is to be noted the characteristic value Xa relates to the roughness of a road surface and the larger the valve Xa is, the higher the roughness of a road surface is.

In the step 730, a decision is made as to whether or not the characteristic value Xa is higher than a predeterminate value Cx. If a decision is made that the value Xa is not higher than Cx, then the flow of control proceeds to the step 750, and if a decision is made that the value Xa is higher than Cx, then the flow of control passes to the next step 740.

In the step 740, a flag Fx for determining rough road is set to one, and next the flow of control passes to the step 760.

In the step 750, the flag Fx for determining rough road is reset to zero and then the flow of control passes next to the step 760.

Thus, in the steps 700 through 750, a decision is made as to whether or not the vehicle runs on a rough road. If a decision is made that the road on which the vehicle runs is rough, then the flag Fx is set to one, and if a decision is made that the road is not rough, then the flag Fx is set to zero.

In the step 760, a decision is made as to whether or not the absolute value of the steering angle velocity delta theta is higher than a predeterminate value $Cl_1$. If a decision is made that the absolute value is higher than $Cl_1$, then the flow of control proceeds to the step 790, and if a decision is made that the absolute value is not higher than $Cl_1$, then the flow of control passes to the next step 770.

In the step 770, a decision is made as to whether or not the absolute value of the changing rate of the lateral acceleration is higher than a predeterminate value $Cl_2$. If a decision is made that the absolute value is higher than $Cl_2$, then the flow of control proceeds to the step 790, and if a decision is made that the absolute value is not higher than $Cl_2$, then the flow of control passes to the next step 780.

In the step 780, a decision is made as to whether or not the absolute value of the the lateral acceleration is higher than a predeterminate value $Cl_3$. If a decision is made that the absolute value is higher than $Cl_3$, then the flow of control proceeds to the step 790, and if a decision is made that the absolute value is not higher than $Cl_3$, then the flow of control passes to the next step 800.

In the step 790, a flag Fl for determining turning is set to one, and next the flow of control passes to the step 810.

In the step 800, the flag Fl for determining turning is reset to zero and then the flow of control passes next to the step 810.

Thus, in the steps 760 through 800, a decision is made as to whether or not the vehicle is turning. If a decision is made that the vehicle is turning, then the flag Fl is set to one, and if a decision is made that the vehicle is not turning, then the flag Fl is set to zero.

In the step 810, a decision is made as to whether or not the idle switch (IDSW) is off. If a decision is made that the idle switch is not off, then the flow of control proceeds to the step 860, and if a decision is made that the idle switch is off, then the flow of control passes to the next step 820.

In the step 820, a decision is made as to whether or not the changing rate of the throttle opening is higher than a predeterminate value $Ca_1$. If a decision is made that the changing rate is higher than $Ca_1$, then the flow of control proceeds to the step 850, and if a decision is made that the changing rate is not higher than $Ca_1$, then the flow of control passes to the next step 830.

In the step 830, a decision is made as to whether or not the changing rate $\dot{G}a$ of the longitudinal acceleration is higher than a predeterminate value $Ca_2$. If a decision is made that the changing rate $\dot{G}a$ is higher than $Ca_2$, then the flow of control proceeds to the step 850, and if a decision is made that the changing rate $\dot{G}a$ is not higher than $Ca_2$, then the flow of control passes to the next step 840.

In the step 840, a decision is made as to whether or not the the longitudinal acceleration Ga is higher than a predeterminate value $Ca_3$. If a decision is made that the the longitudinal acceleration Ga is higher than $Ca_3$, then the flow of control proceeds to the step 850, and if a decision is made that the longitudinal acceleration Ga is not higher than $Ca_3$, then the flow of control passes to the next step 860.

In the step 850, a flag Fa for determining acceleration is set to one, and next the flow of control passes to the step 870.

In the step 860, the flag Fa for determining acceleration is reset to zero and then the flow of control passes next to the step 870.

Thus, in the steps 810 through 860, a decision is made as to whether or not the vehicle is accelerating. If a decision is made that the vehicle is accelerating, then the flag Fa is set to one, and if a decision is made that the vehicle is not accelerating, then the flag Fa is set to zero.

In the step 870, a decision is made as to whether or not the brake switch (BKSW) is on. If a decision is made that the brake switch is on, then the flow of control proceeds to the step 890, and if a decision is made that the brake switch is not on, then the flow of control passes to the next step 880.

In the step 880, a decision is made as to whether or not the idle switch (IDSW) is on. If a decision is made that the idle switch is not on, then the flow of control proceeds to the step 920, and if a decision is made that the idle switch is on, then the flow of control passes to the next step 890.

In the step 890, a decision is made as to whether or not the changing rate $\dot{G}a$ of the longitudinal acceleration is lower than a predeterminate value $-Cb_1$. If a decision is made that the changing rate $\dot{G}a$ is lower than $-Cb_1$, then the flow of control proceeds to the step 910, and if a decision is made that the changing rate $\dot{G}a$ is not lower than $-Cb_1$, then the flow of control passes to the next step 900.

In the step 900, a decision is made as to whether or not the longitudinal acceleration $\dot{G}a$ is lower than a predeterminate value $-Cb_2$. If a decision is made that the longitudinal acceleration Ga is not lower than $-Cb_2$, then the flow of control proceeds to the step 920, and if a decision is made that the longitudinal acceleration Ga is lower than $-Cb_2$, then the flow of control passes to the next step 910.

Figure 8A:
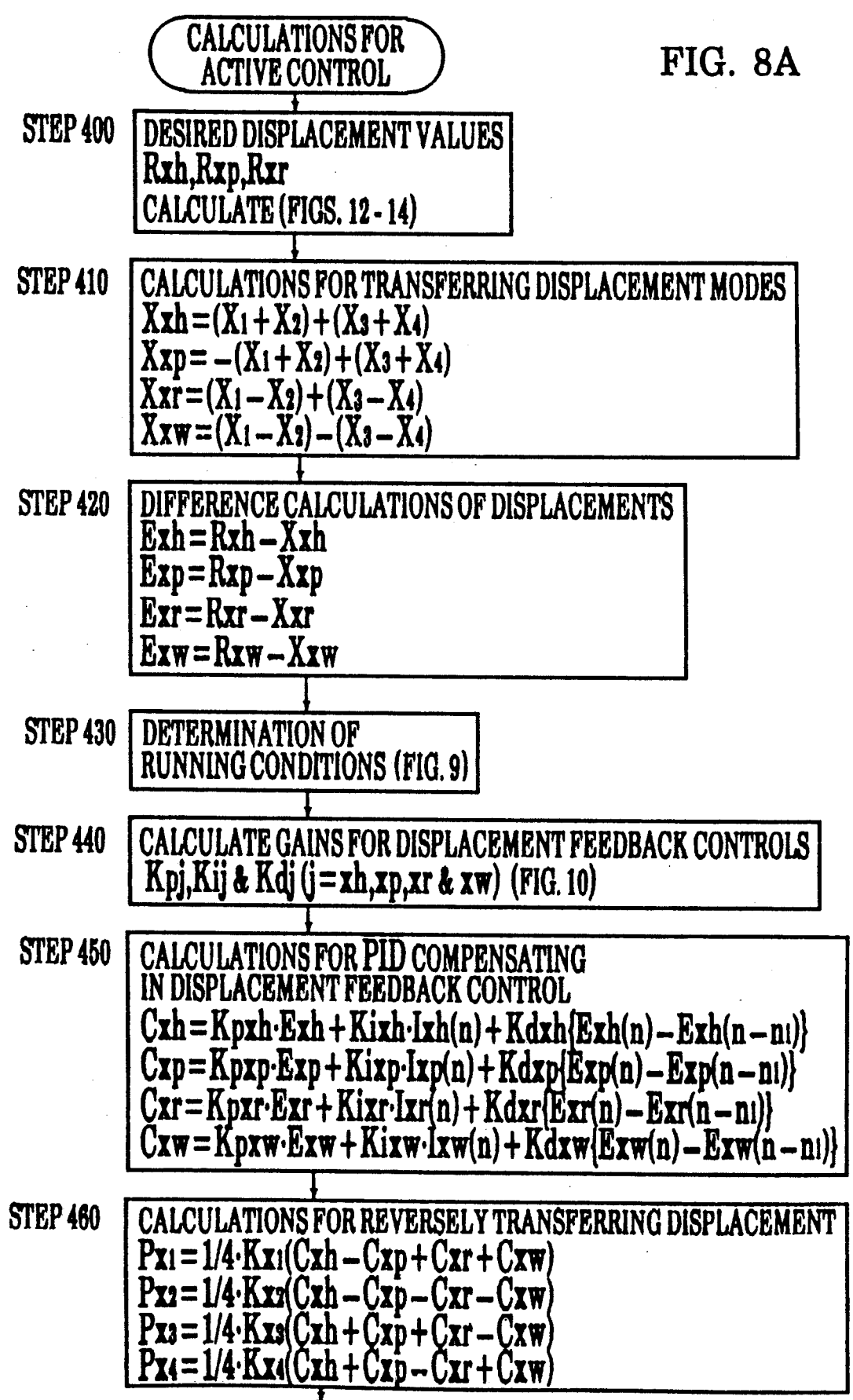
FIGS. 8A through 8C are flow charts showing the subroutine of the calculations for the active control carried out in the step 150 in the flow chart shown in FIG. 3.

In the step 910, a flag Fb for determining deceleration is set to one, and next the flow of control passes to the step 440 in the flow chart shown in FIG. 8A.

In the step 920, the flag Fb for determining deceleration is reset to zero and then the flow of control passes to the step 440.

Thus, in the steps 870 through 920, a decision is made as to whether or not the vehicle is decelerating. If a decision is made that the vehicle is decelerating, then the flag Fb is set to one, and if a decision is made that the vehicle is not decelerating, then the flag Fb is set to zero.

Next with reference to the flow chart shown in FIG. 10, the routine for calculating the gains for displacement feedback controls executed in the step 440 in the flow chart shown in FIG. 8A will be explained.

In the first step 1000, a decision is made as to whether or not the flag Fx for determining rough road is one. If a decision is made that the flag Fx is not one, then the flow of control passes next to the step 1020, and if a decision is made that the flag Fx is one, then the flow of control passes to the next step 1010.

Figure 22:
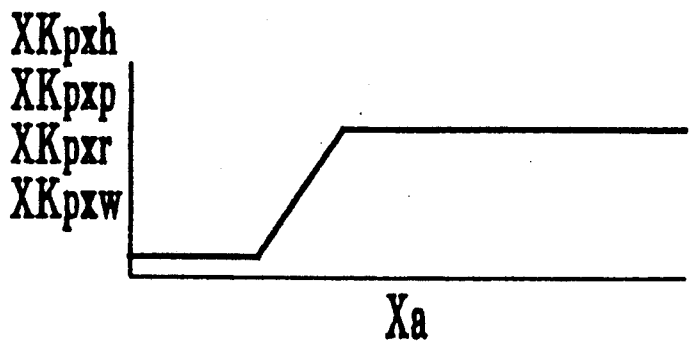
FIGS. 22 through 24 are graphs showing the relationships between a characteristic value Xa for determining rough road and gain components.
Figure 23:
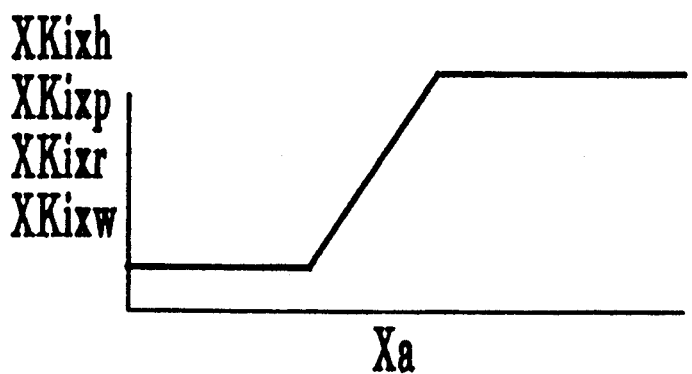
Figure 24:
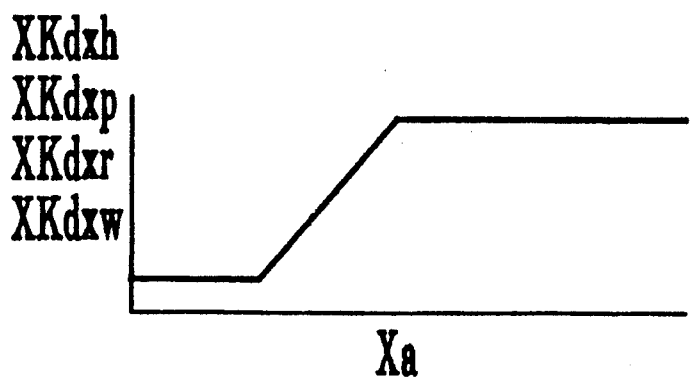

In the step 1010, the following gain components in the equations for the calculations carried out in the step 450 in the flow chart shown in FIG. 8A are calculated according to the maps corresponding to the graphs shown in FIGS. 22, 23 and 24, respectively, and thereafter the flow of control is transferred to the step 1030.

The gain components for rough road for the gains of the P terms (proportional terms):

$$XK_{pxh}, XK_{pxp}, XK_{pxr} \text{ and } XK_{pxw}$$

The gain components for rough road for the gains for the I terms (integral terms):

$$XK_{ixh}, XK_{ixp}, XK_{ixr} \text{ and } XK_{ixw}$$

The gain components for rough road for the gains of the D terms (differential terms):

XKdxh, XKdxp, XKdxr, and XKdxw

In the step 1020, the gain components for rough road are set to zero, and then the flow of control proceeds to the next step 1030.

In the step 1030, a decision is made as to whether or not the flag Fl for determining turning is one. If a decision is made that the flag Fl is not one, then the flow of control passes next to the step 1050, and if a decision is made that the flag Fl is one, then the flow of control passes to the next step 1040.

Figure 25:
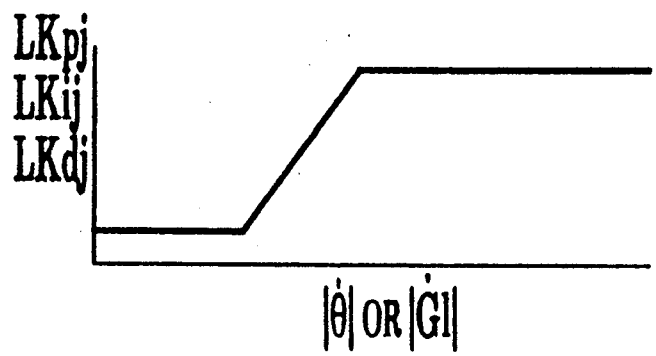
FIG. 25 is a graph showing the relationships between the absolute value of a steering angle velocity or the absolute value of the changing rate of a lateral acceleration and gain components.

In the step 1040, the following gain components in the equations for the calculations carried out in the step 450 in the flow chart shown in FIG. 8A are calculated according to the maps corresponding to the graph shown in FIG. 25, and thereafter the flow of control is transferred to the step 1060.

The gain components for turning for the gains of the P terms (proportional terms):

LKpxh, LKpxp, LKpxr and LKpxw

The gain components for turning for the gains of the I terms (integral terms):

LKixh, LKixp, LKixr and LKixw

The gain components for turning for the gains of the D terms (differential terms):

LKdxh, LKdxp, LKdxr, and LKdxw

In the step 1050, the gain components for turning are set to zero, and then the flow of control proceeds to the next step 1060.

In the step 1060, a decision is made as to whether or not the flag Fa for determining acceleration is one. If a decision is made that the flag Fa is not one, then the flow of control passes next to the step 1080, and if a decision is made that the flag Fa is one, then the flow of control passes to the next step 1070.

Figure 26:
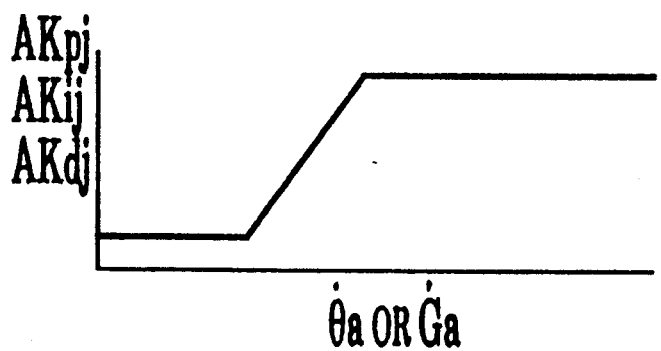
FIG. 26 is a graph showing the relationships between the changing rate of a throttle opening or the changing rate of a longitudinal acceleration and gain components.

In the step 1070, the following gain components in the equations for the calculations carried out in the step 450 in the flow chart shown in FIG. 8A are calculated according to the maps corresponding to the graph shown in FIG. 26, and thereafter the flow of control is transferred to the step 1090.

The gain components for acceleration for the gains of the P terms (proportional terms):

AKpxh, AKpxp, AKpxr and AKpxw

The gain components for for acceleration the gains of the I terms (integral terms):

AKixh, AKixp, AKixr and AKixw

The gain components for acceleration for the gains of the D terms (differential terms):

AKdxh, AKdxp, AKdxr, and AKdxw

In the step 1080, the gain components for acceleration are set to zero, and then the flow of control proceeds to the next step 1090.

In the step 1090, a decision is made as to whether or not the flag Fb for determining deceleration is one. If a decision is made that the flag Fb is not one, then the flow of control passes next to the step 1110, and if a decision is made that the flag Fb is one, then the flow of control passes to the next step 1100.

Figure 27:
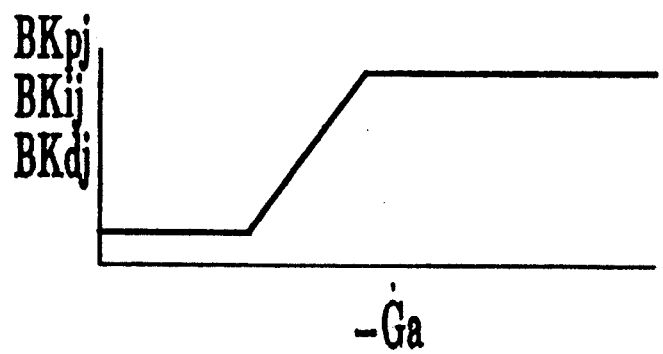
FIG. 27 is a graph showing the relationships between the changing rate of a longitudinal acceleration and gain components.
Figure 28:
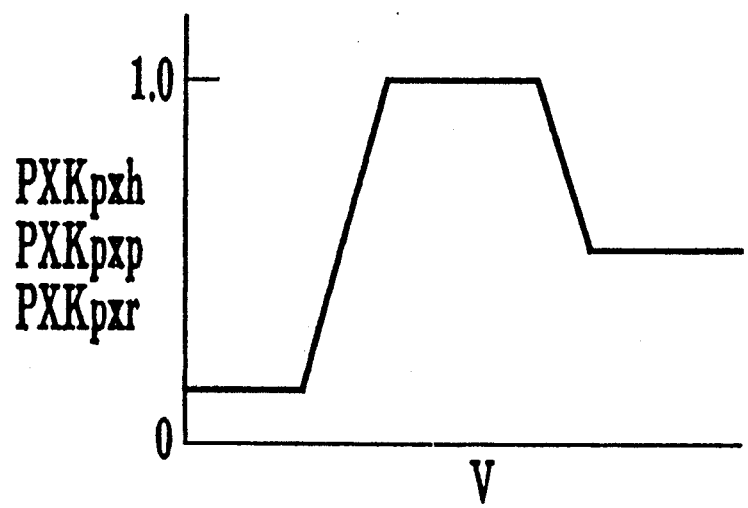
FIGS. 28 through 34 are graphs showing the relationships between a vehicle speed V and the compensating coefficients for gain components.
Figure 29:
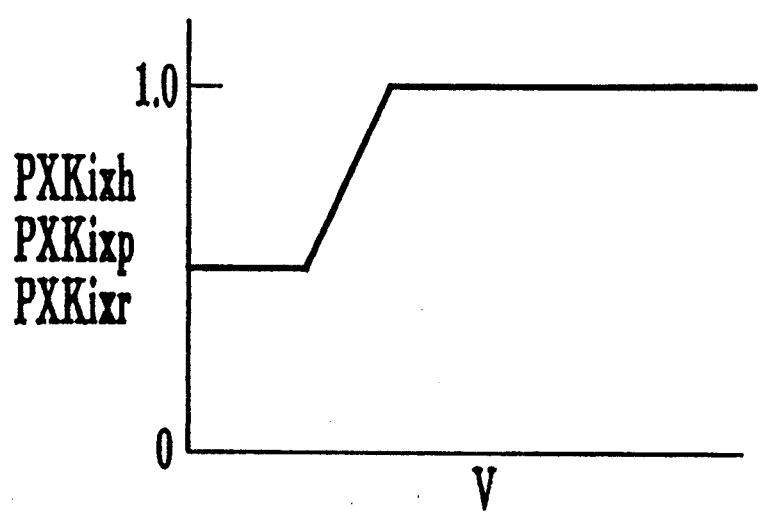
Figure 30:
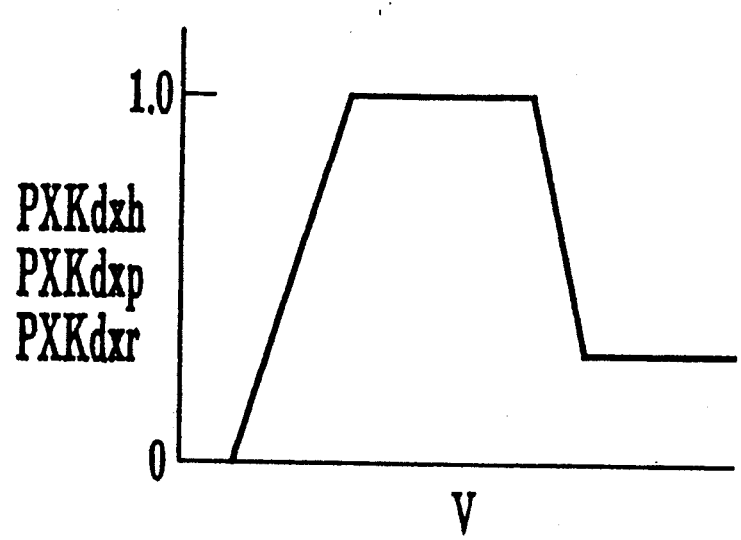
Figure 31:
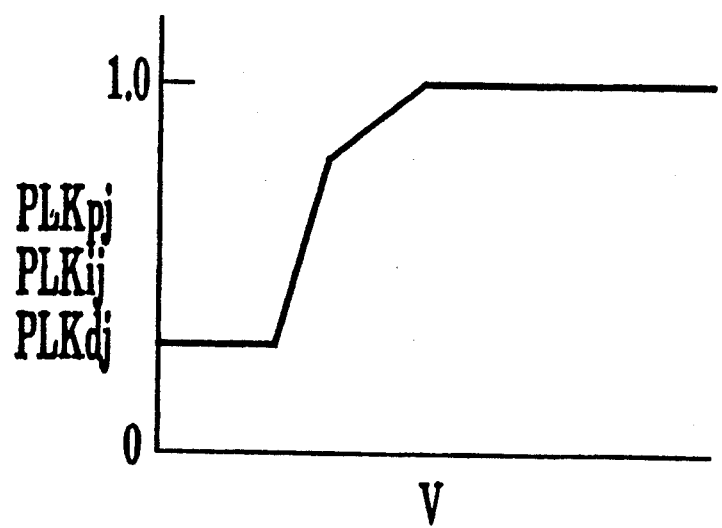
Figure 32:
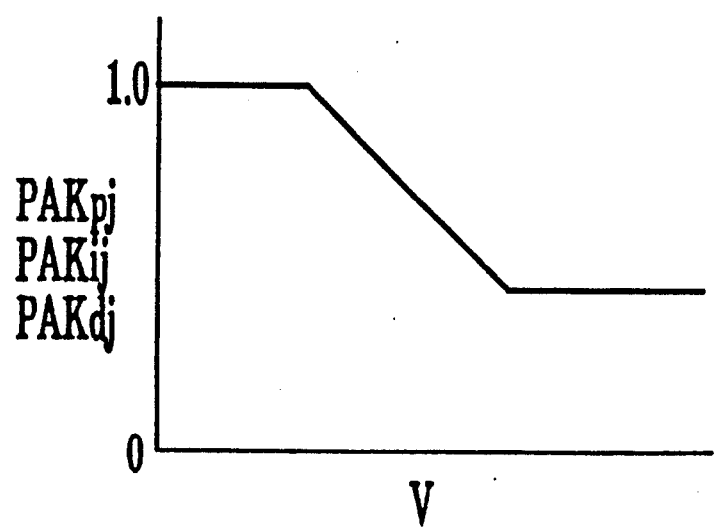
Figure 33:
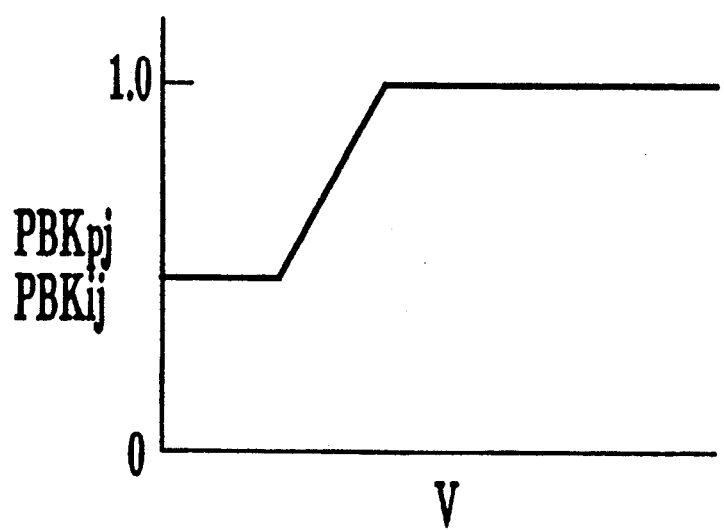
Figure 34:
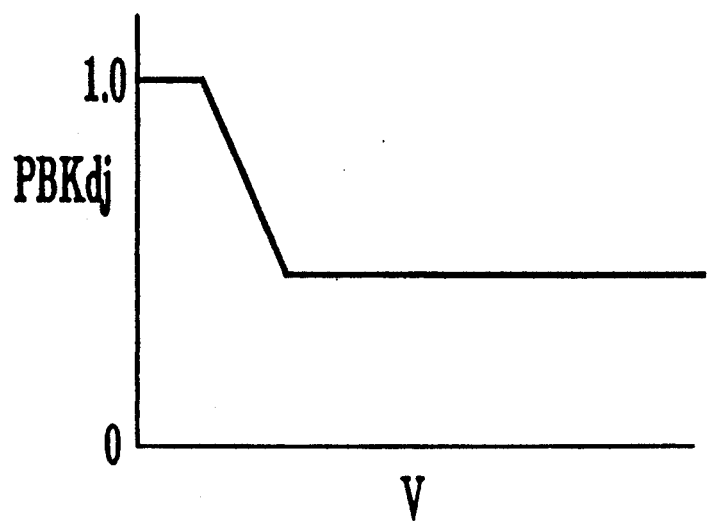

In the step 1100, the following gain components in the equations for the calculations carried out in the step 450 in the flow chart shown in FIG. 8A are calculated according to the maps corresponding to the graph shown in FIG. 27, and thereafter the flow of control is transferred to the step 1120.

The gain components for deceleration for the gains of the P terms (proportional terms):

BKpxh, BKpxp, BKpxr and BKpxw

The gain components for for deceleration the gains of the I terms (integral terms):

BKixh, BKixp, BKixr and BKixw

The gain components for deceleration for the gains of the D terms (differential terms):

BKdxh, BKdxp, BKdxr, and BKdxw

In the step 1110, the gain components for deceleration are set to zero, and then the flow of control proceeds to the next step 1120.

In the step 1120, according to the maps corresponding to the graphs shown in FIGS. 28 through 34, the following compensating coefficients for the gain components calculated in the steps 1010, 1040, 1070 and 1100 are calculated, and then the flow of control passes next to the step 1130.

PXKpj, PXKij and PXKdj

PLKpj, PLKij and PLKdj

PAKpj, PAKij and PAKdj

PBKpj, PBKij and PBKdj (j = xh, xp, xr and xw)

In the step 1130, based upon the gain components calculated in the steps 1010, 1040, 1070 and 1100 and the compensating coefficients calculated in the 1120, the gains for displacement feedback controls, i.e., the gains Kpj, Kij and Kdj (j=xh, xp, xr and xw) for the P terms, the I terms and the D terms, respectively, in the equations for the calculations carried out in the step 450 in the flow chart shown in FIG. 8A are calculated according to the following equations, and thereafter the flow of control is transferred to the step 450 in the flow chart shown in FIG. 8A.

$$Kpj = PXKpj(-XKpj) + PLKpj \cdot LKpj + PAKpj \cdot AKpj + PBKpj \cdot BKpj + Cpj$$

$$Kij = PXKij(-XKpj) + PLKij \cdot LKij + PAKij \cdot AKij + PBKij \cdot BKij + Cij$$

$$Kdj = PXKdj(-XKdj) + PLKdj \cdot LKdj + PAKdj \cdot AKdj + PBKdj \cdot BKdj + Cdj$$

In the equations, j represents xh, xp, xr and xw, and Cpj, Cij, and Cdj are constants.

Next with reference to the flow chart shown in FIG. 11, the routine for calculating the gains for acceleration feedback controls executed in the step 480 in the flow chart shown in FIG. 8B will be explained.

In the first step 1200, a decision is made as to whether or not the flag Fx for determining rough road is one. If a decision is made that the flag Fx is not one, then the flow of control passes next to the step 1220, and if a decision is made that the flag Fx is one, then the flow of control passes to the next step 1210.

Figure 8B:
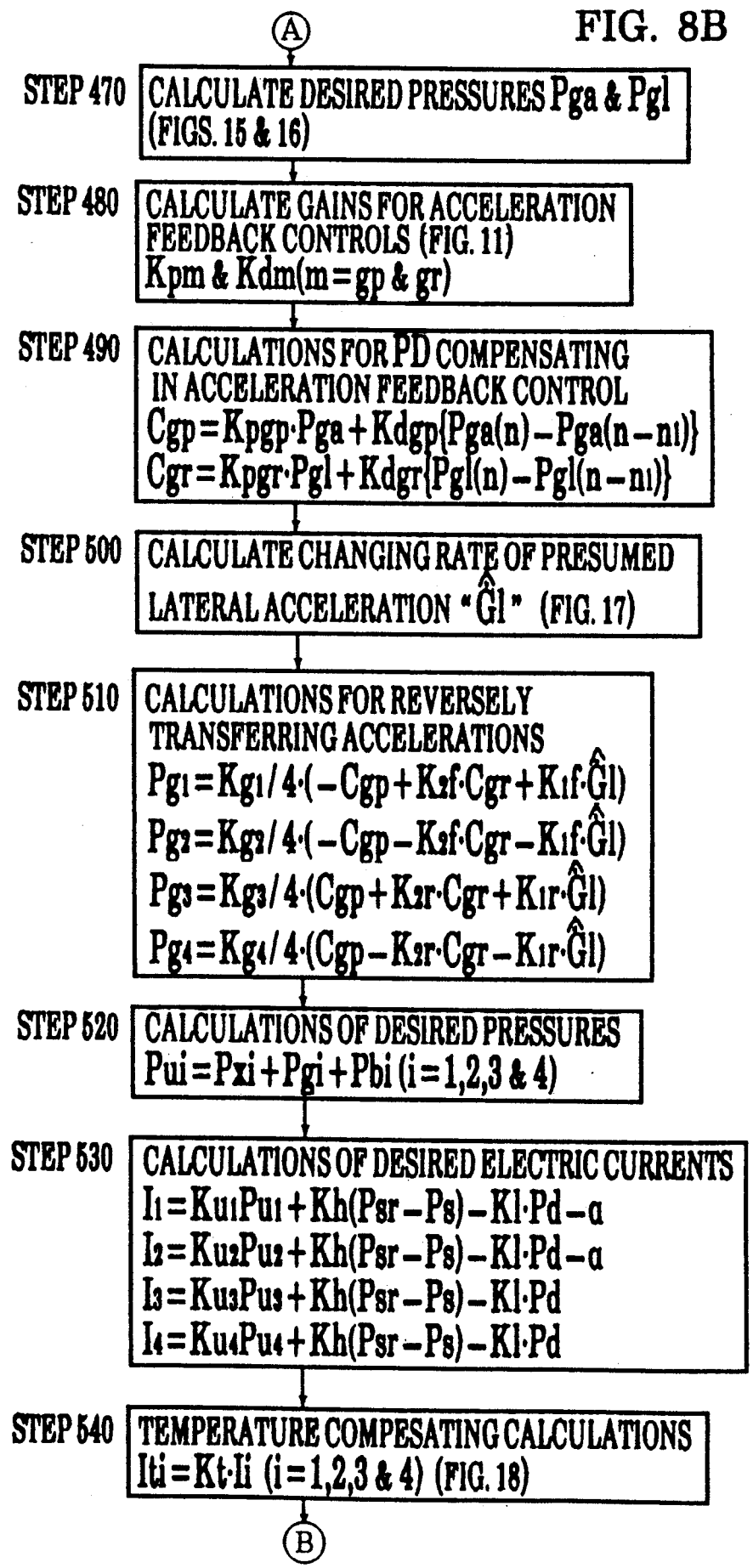
Figure 8C:
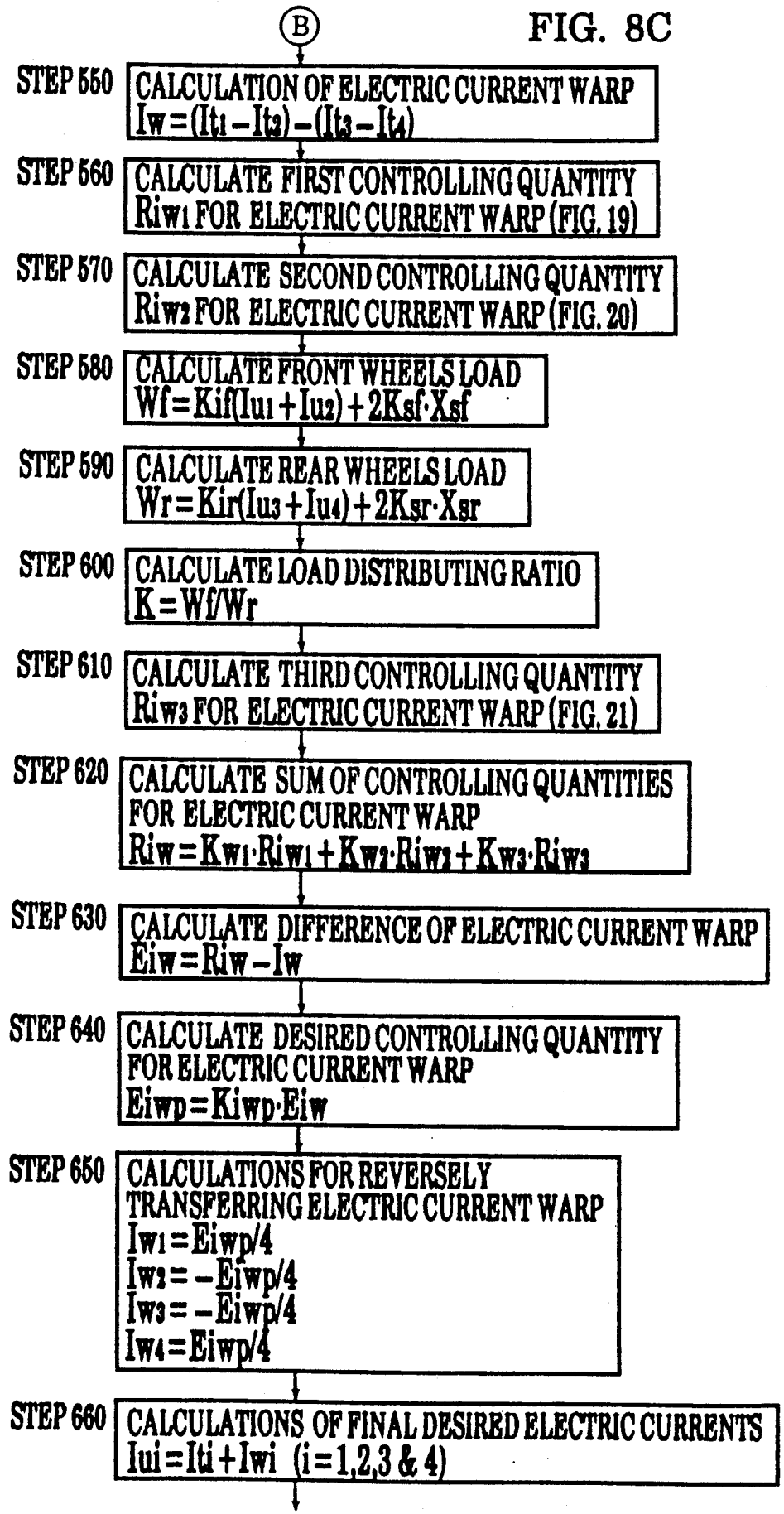
Figure 35:
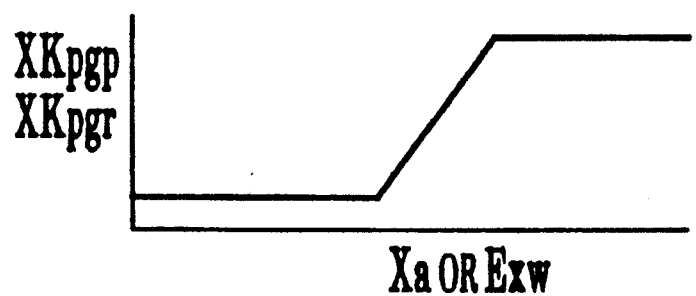
FIGS. 35 and 36 are graphs showing the relationships between a characteristic value Xa for determining rough road or the warp amount Exw of vehicle heights and gain components.
Figure 36:
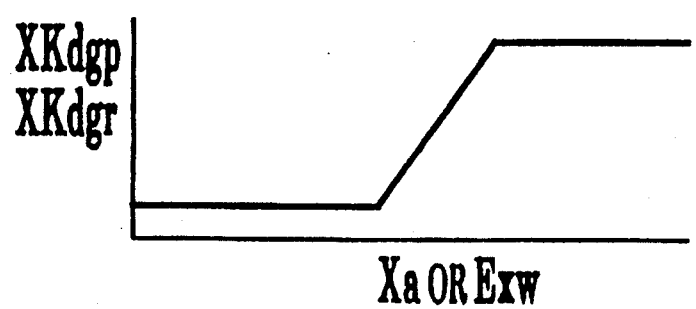

In the step 1210, the following gain components in the equations for the calculations carried out in the step 490 in the flow chart shown in FIG. 8B are calculated according to the maps corresponding to the graphs shown in FIGS. 35 and 36, respectively, and thereafter the flow of control is transferred to the step 1230.

The gain components for rough road for the gains of the P terms (proportional terms):

XKpgp and XKpgr

The gain components for rough road for the gains of the D terms (differential terms):

XKdgp and XKdgr

In the step 1220, the gain components for rough road are set to zero, and then the flow of control proceeds to the next step 1230.

In the step 1230, a decision is made as to whether or not the flag Fl for determining turning is one. If a decision is made that the flag Fl is not one, then the flow of control passes next to the step 1250, and if a decision is made that the flag Fl is one, then the flow of control passes to the next step 1240.

Figure 37:
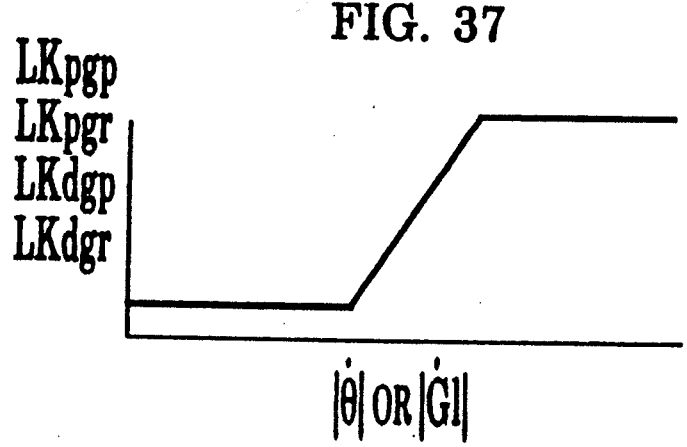
FIG. 37 is a graph showing the relationships between the absolute value of a steering angle velocity or the absolute value of the changing rate of a lateral acceleration and gain components.

In the step 1240, the following gain components in the equations for the calculations carried out in the step 450 in the flow chart shown in FIG. 8A are calculated according to the map corresponding to the graph shown in FIG. 37, and thereafter the flow of control is transferred to the step 1260.

The gain components for turning for the gains of the P terms (proportional terms):

LKpgp and LKpgr

The gain components for turning for the gains of the D terms (differential terms):

LKdgp and LKdgr

In the step 1250, the gain components for turning are set to zero, and then the flow of control proceeds to the next step 1260.

In the step 1260, a decision is made as to whether or not the flag Fa for determining acceleration is one. If a decision is made that the flag Fa is not one, then the flow of control passes next to the step 1280, and if a decision is made that the flag Fa is one, then the flow of control passes to the next step 1270.

Figure 38:
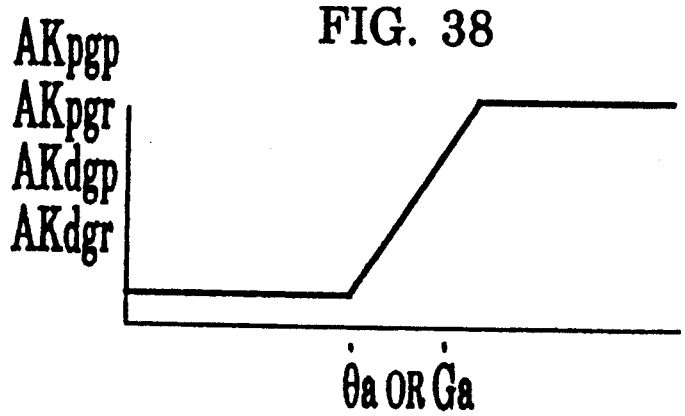
FIG. 38 is a graph showing the relationships between the changing rate of a throttle opening or the changing rate of a longitudinal acceleration and gain components.

In the step 1270, the following gain components in the equations for the calculations carried out in the step 490 in the flow chart shown in FIG. 8B are calculated according to the maps corresponding to the graph shown in FIG. 38, and thereafter the flow of control is transferred to the step 1290.

The gain components for acceleration for the gains of the P terms (proportional terms):

AKpgp and AKpgr

The gain components for acceleration for the gains of the D terms (differential terms):

AKdgp and AKdgr

In the step 1280, the gain components for acceleration are set to zero, and then the flow of control proceeds to the next step 1290.

In the step 1290, a decision is made as to whether or not the flag Fb for determining deceleration is one. If a decision is made that the flag Fb is not one, then the flow of control passes next to the step 1310, and if a decision is made that the flag Fb is one, then the flow of control passes to the next step 1300.

Figure 39:
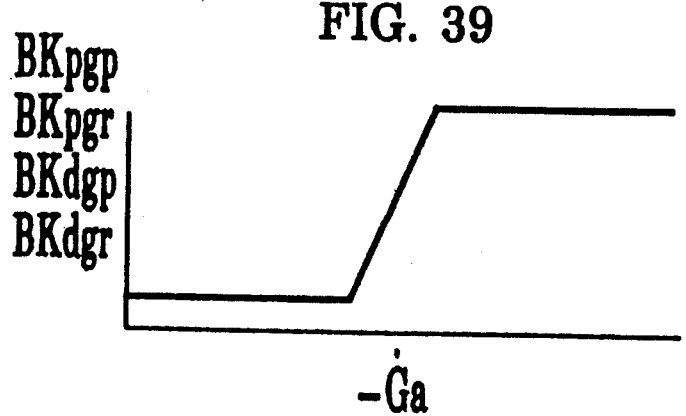
FIG. 39 is a graph showing the relationships between the changing rate of a longitudinal acceleration and gain components.
Figure 40:
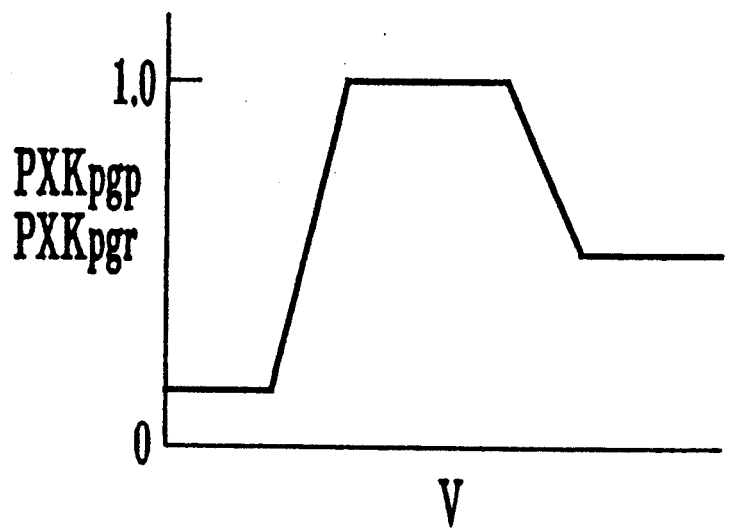
FIGS. 40 through 45 are graphs showing the relationships between a vehicle speed V and the compensating coefficients for gain components.
Figure 41:
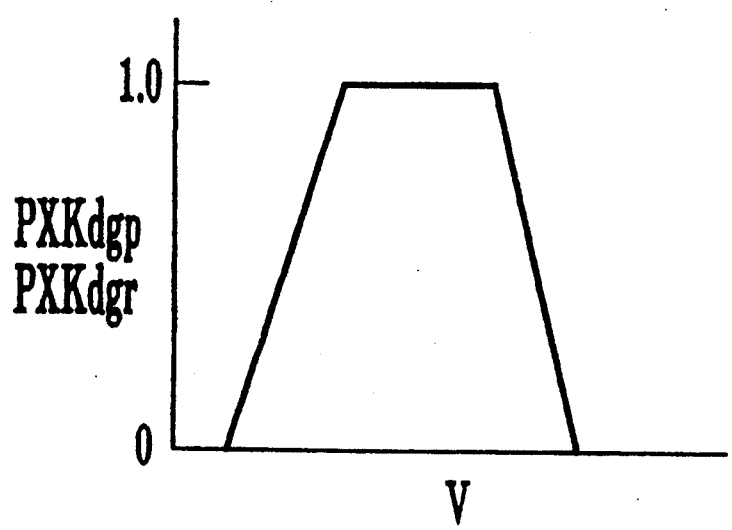
Figure 42:
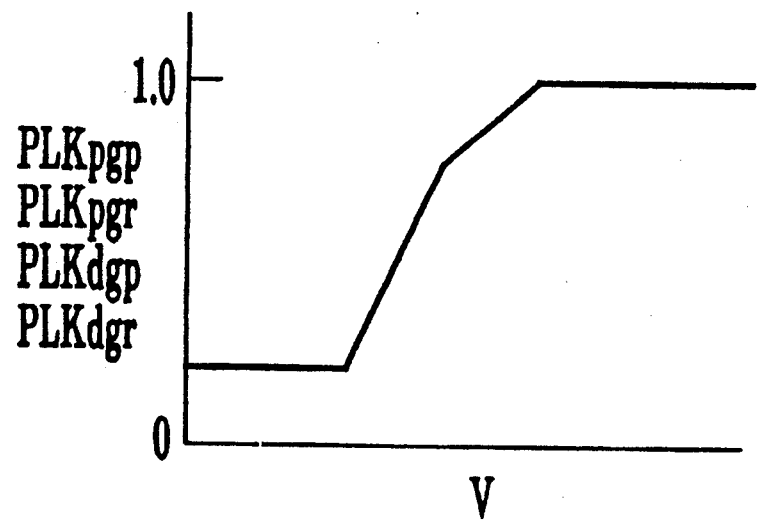
Figure 43:
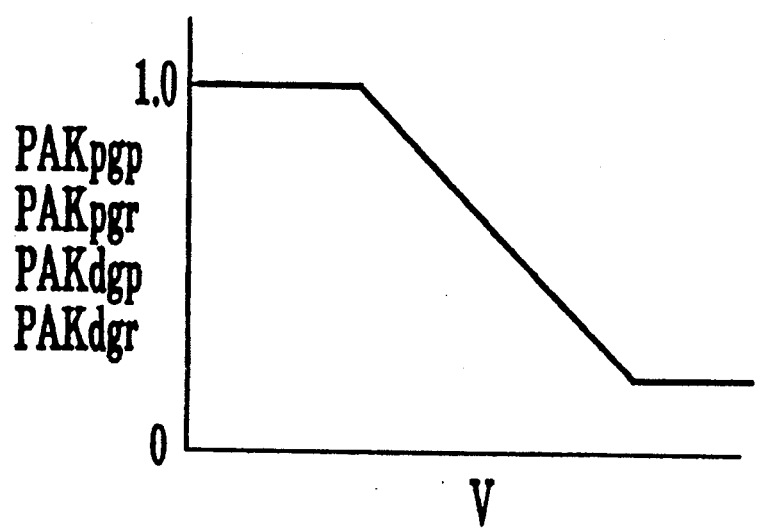
Figure 44:
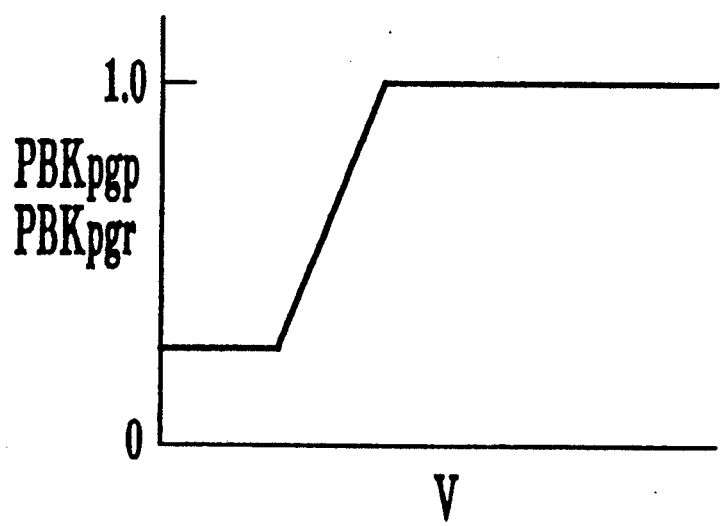
Figure 45:
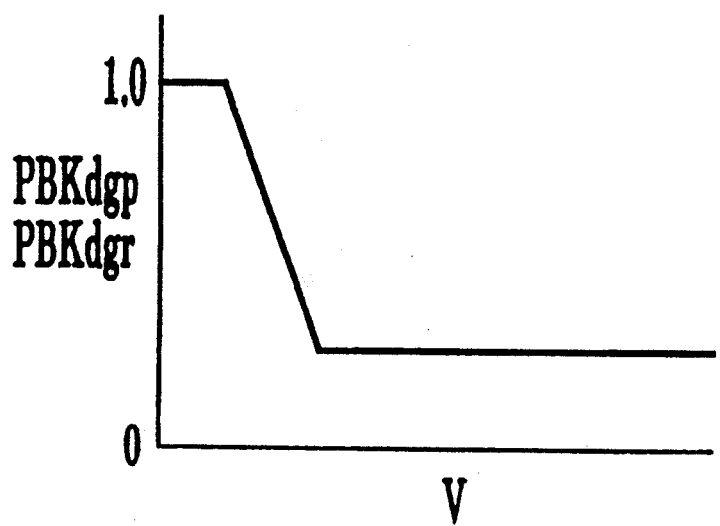

In the step 1300, the following gain components in the equations for the calculations carried out in the step 490 in the flow chart shown in FIG. 8B are calculated according to the map corresponding to the graph shown in FIG. 39, and thereafter the flow of control is transferred to the step 1320.

The gain components for deceleration for the gains of the P terms (proportional terms):

BKpgp and BKpgr

The gain components for deceleration for the gains of the D terms (differential terms):

BKdgp and BKdgr

In the step 1310, the gain components for deceleration are set to zero, and then the flow of control proceeds to the next step 1320.

In the step 1320, according to the maps corresponding to the graphs shown in FIGS. 40 through 45, the following compensating coefficients for the gain components calculated in the steps 1210, 1240, 1270 and 1300 are calculated, and then the flow of control passes next to the step 1330.

PXKpgp and PXKpgr

PLKpgp and PLKpgr

PAKpgp and PAKpgr

PBKpgp and PBKpgr

In the step 1330, based upon the gain components calculated in the steps 1210, 1240, 1270 and 1300 and the compensating coefficients calculated in the 1320, the gains for acceleration feedback controls, i.e., the gains Kpgp and Kpgr for the P terms and the gains Kdgp and Kdgr for the D terms in the equations for the calculations carried out in the step 490 in the flow chart shown in FIG. 8B are calculated according to the following equations, and thereafter the flow of control is transferred to the step 490 in the flow chart shown in FIG. 8B.

$$Kpgp = PXKpgp(-XKpgp) + PLKpgp \cdot LKpgp + PAKpgp \cdot AKpgp + PBKpgp \cdot BKpgp + Cpgp$$

$$Kpgr = PXKpgr(-XKpgr) + PLKpgr \cdot LKpgr + PAKpgr \cdot AKpgr + PBKpgr \cdot BKpgr + Cpgr$$

$$Kdgp = PXKdgp(-XKdgp) + PLKdgp \cdot LKdgp + PAKdgp \cdot AKdgp + PBKdgp \cdot BKdgp + Cdgp$$

$$Kdgr = PXKdgr(-XKdgr) + PLKdgr \cdot LKdgr + PAKdgr \cdot AKdgr + PBKdgr \cdot BKdgr + Cdgr$$

In the equations, $C_{pgp}$, $C_{pgr}$, $C_{dgp}$ and $C_{dgr}$ are constants.

Thus, according to the present invention, in addition to the calculations for controlling the comfortability of the vehicle and the attitude of the vehicle body being conducted in the step 400 through 530, the calculations for controlling the US-OS characteristic are carried out in the step 550 through 650.

Particularly, as shown by inclined lines in FIG. 20, the second controlling quantity $Riw_2$ for electric current warp is so set that the larger the steering angle velocity is, the higher the absolute value of the quantity may be, and, accordingly, the larger the steering angle velocity is, the more the US-OS characteristic may be shifted toward higher over-steer. Therefore, a better response in steering during transitional turning can be assured.

As shown by inclined lines in FIG. 19, the first controlling quantity $Riw_1$ for electric current warp is so set that the higher the lateral acceleration is, the larger the absolute value of the quantity may be, and, accordingly, for the same steering angle velocity the higher the lateral acceleration is, the more the US-OS characteristic may be shifted toward higher under-steer. Therefore, the US-OS characteristic during transitional turning can appropriately be set in accordance with not only the steering angle velocity but also the lateral acceleration, which can enhance both the steering response during transitional turning and the controllability and stability during turning.

For example, in the situations where a transitional turning is conducted at a certain steering angle velocity, when the lateral acceleration is lower, the US-OS characteristic is not so much shifted toward higher under-steer, and the US-OS characteristic is set to relatively higher over-steer, so that a better response during transitional turning periods can be assured, while, when the lateral acceleration is higher, the US-OS characteristic is shifted toward higher under-steer, and the degree in over-steer is reduced or the US-OS characteristic is set to substantially neutral or under-steer, so that the controllability and stability of the vehicle can be enhanced.

Further, as shown by inclined lines in FIG. 21, the third controlling quantity $Riw_3$ is so set that for the same lateral acceleration, the higher the front wheels load is, the lower the quantity may be and the higher the rear wheels load is, the higher the quantity may be. That is, the US-OS characteristic is so set that the higher the front wheels load is, the more the characteristic may be shifted toward under-steer, and on the other hand, the higher the rear wheels load is, the more the characteristic may be shifted toward over-steer. According to the embodiment, therefore, in the case where the ratio of distributing load between the front and the rear vehicle wheels is varied due to the weight shift caused by acceleration and deceleration and/or the change in loaded weight, the US-OS characteristic is so controlled that the change in US-OS characteristic due to these causes may be canceled, which can also enhance the controllability and stability of the vehicle.

While the abscissa in the graphs shown in FIGS. 19 and 21 is lateral acceleration, it may be yaw rate of the vehicle body. The graph shown in FIG. 19 may be changed with a three dimensional map having parameters of steering angle and vehicle speed. Again, while the abscissa in the graph shown in FIG. 20 is steering angle velocity, it may be the changing rate of lateral acceleration or the changing rate of yaw rate.

The above described steps 430, 440 and 480 are not essential to the present invention and may accordingly be omitted. In that case, the gains $K_{pj}$, $K_{ij}$ and $K_{dj}$ (j=xh, xp, xr and xw) in the equations in the step 450 and the gains $K_{pm}$ and $K_{dm}$ (m=gp and gr) in the equations in the step 490 may be appropriate constants.

While the pressure control means are pressure control valves in the above mentioned embodiments, they may be flow rate control valves as long as they can control the flow rate of the working fluid supplied to and discharged from the working fluid chambers to control the pressures within the chambers.

Although the present invention has been shown and described in detail in terms of particular preferred embodiment, the present invention is not restricted to the embodiment, and it will be seen by those skilled in the relevant art that various modifications may be made without departing from the scope of the present invention.

What is claimed is:

1. A control system for controlling the US-OS characteristic of a vehicle having suspension for the front and the rear vehicle wheels, comprising:
   a means for changing the US-OS characteristic of the vehicle;
   a means for detecting a turning state quantity;
   a means for determining the changing rate of a turning state quantity;
   a control means which, in response to the turning state quantity detected by said detecting means and the changing rate of the turning state quantity determined by said determining means, controls said US-OS characteristic changing means so that the higher the changing rate of the turning state quantity is, the more the US-OS characteristic may be shifted toward higher over-steer, and for the same changing rate the higher the turning state quantity is, the more the US-OS characteristic may be shifted toward higher under-steer.

2. A control system for controlling the US-OS characteristic of a vehicle according to claim 1, said means for changing the US-OS characteristic is adapted so as to alter the roll stiffness distribution between the front and the rear suspension.

3. A control system for controlling the US-OS characteristic of a vehicle according to claim 2, wherein said means for detecting a turning state quantity is adapted to detect a turning state quality selected from a group consisting of a lateral acceleration, the combination of a steering angle and a vehicle speed, and a yaw rate.

4. A control system for controlling the US-OS characteristic of a vehicle according to claim 2, wherein said means for determining the changing rate of a turning state quantity is adapted to determine the changing rate of said turning state quality selected from a group consisting of a lateral acceleration, a steering angle and a yaw rate.

5. A control system for controlling the US-OS characteristic of a vehicle according to claim 1, further comprising means for detecting the acceleration and the deceleration of said vehicle and said control means is adapted in response to said acceleration and deceleration detecting means to control said means for changing the US-OS characteristic so that for the same changing rate of a turning state quantity the higher the loaded weight of said front suspension is, the more the US-OS characteristic may be shifted toward higher under-steer, and the higher the loaded weight of said rear suspension is, the more the US-OS characteristic may be shifted toward higher over-steer.

* * * * *